US008739474B2

(12) United States Patent
Chang et al.

(10) Patent No.: US 8,739,474 B2
(45) Date of Patent: Jun. 3, 2014

(54) PORTABLE SHELTER

(75) Inventors: Leo Yih Lang Chang, Livingston, NJ (US); Phillip Wu, Victoria, TX (US)

(73) Assignee: Inteplast Group, Ltd., Livingston, NJ (US)

( * ) Notice: Subject to any disclaimer, the term of this patent is extended or adjusted under 35 U.S.C. 154(b) by 8 days.

(21) Appl. No.: 13/480,142

(22) Filed: May 24, 2012

(65) Prior Publication Data

US 2013/0312800 A1    Nov. 28, 2013

(51) Int. Cl.
*E04H 15/32* (2006.01)

(52) U.S. Cl.
USPC ............... 52/79.5; 52/64; 135/128; 135/148; 135/157

(58) Field of Classification Search
USPC .......... 52/63, 64, 83, 86, 90.1, 91.1, 91.3, 94, 52/96, 79.5, 18; 135/148, 128, 157, 143, 135/137, 145
See application file for complete search history.

(56) References Cited

U.S. PATENT DOCUMENTS

| | | | |
|---|---|---|---|
| 2,485,914 A | 10/1949 | Owens | |
| 2,670,986 A | 3/1954 | Presnell | |
| 2,883,713 A | 4/1959 | Zug | |
| 3,186,524 A * | 6/1965 | Spaeth, Jr. | 52/86 |
| 3,407,546 A * | 10/1968 | Yates et al. | 52/18 |
| 3,443,344 A * | 5/1969 | Williams, Jr. | 52/18 |
| 3,534,512 A * | 10/1970 | Ballas | 52/67 |
| 3,629,982 A * | 12/1971 | Ballay et al. | 52/69 |
| 3,744,841 A * | 7/1973 | Schmidt | 296/26.04 |
| 3,854,266 A * | 12/1974 | Salas | 52/745.14 |
| 3,967,023 A * | 6/1976 | Lysek | 428/102 |

(Continued)

FOREIGN PATENT DOCUMENTS

| | | |
|---|---|---|
| EP | 0109108 A1 | 5/1984 |
| WO | 0120090 A1 | 3/2001 |

OTHER PUBLICATIONS

Unknown, Instructables, share what you make, printed from www.instructables.com/id/SHELLHOUSE---%5Bliving-portable%5D/, printed on Dec. 5, 2011, 7 pages.

(Continued)

*Primary Examiner* — William Gilbert
*Assistant Examiner* — Beth Stephan
(74) *Attorney, Agent, or Firm* — Senniger Power LLP

(57) ABSTRACT

A portable shelter is erectable on a support surface for providing short to long term housing for humans. In general, the shelter includes a foundation, a floor supported by the foundation, and an enclosure. The shelter defines an interior which may be inhabited by a human. The shelter may include front, rear, side, and top walls, all of which may be folded to define inboard and outboard folds which enhance the structural integrity of the walls. The floor of the structure may include indentations corresponding to inboard folds of one or more walls for receiving the inboard folds for enhancing structural integrity of the shelter. The floor may be folded to form upstanding portions adjacent the indentations for securing the inboard folds in the indentations. Moreover, the walls may be folded to define feet which engage the support surface.

19 Claims, 31 Drawing Sheets

(56) References Cited

U.S. PATENT DOCUMENTS

| | | | |
|---|---|---|---|
| 4,150,682 A * | 4/1979 | Ryce | 135/130 |
| 4,649,947 A | 3/1987 | Tury et al. | |
| 5,172,526 A | 12/1992 | Morgan | |
| 6,054,194 A * | 4/2000 | Kane | 428/12 |
| 6,553,725 B2 * | 4/2003 | Washington | 52/64 |
| 6,601,598 B2 | 8/2003 | Clee et al. | |
| 6,948,281 B1 * | 9/2005 | Carmichael | 52/86 |
| 7,874,304 B2 | 1/2011 | Ostrowski | |
| 8,156,690 B2 * | 4/2012 | Higley | 52/79.5 |
| 2010/0236594 A1 | 9/2010 | Hammann | |

OTHER PUBLICATIONS

Unknown, EnviroGadget, gadgets for the eco-warrior, printed from www.envirogadget.co/odd-gadgets/cardborigami-cardboard-shelter-for-victims-of-calamities/#more-5681, printedon Dec. 5, 2011, 7 pages.

Korean Intellectual Property Office, PCT/US2012/046240 International Search Report dated Feb. 27, 2013, 5 pages.

Korean Intellectual Property Office, PCT/US2012/046240 Written Opinion dated Feb. 27, 2013, 5 pages.

* cited by examiner

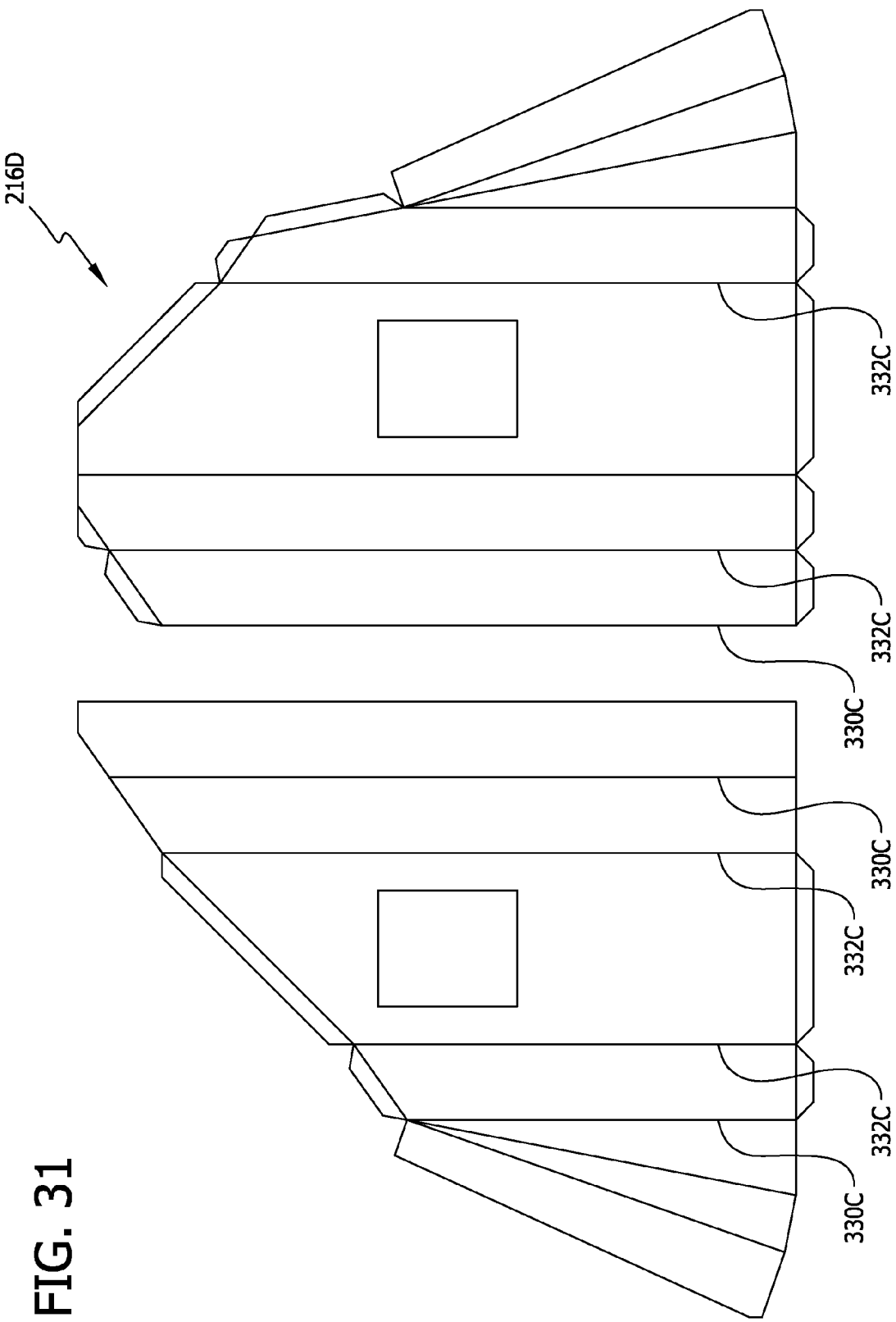

PORTABLE SHELTER

FIELD OF THE INVENTION

The present invention generally relates to shelters for humans, and more particularly to shelters which are portable.

BACKGROUND

Portable shelters are useful in various situations where humans need protection from the environment. For example, persons may be displaced from their homes by natural disasters or be homeless due to other circumstances. Portable shelters may be used to provide short-term housing for such persons.

SUMMARY

In one aspect, the present invention is directed to a portable shelter which is erectable on a support surface for defining an interior for temporarily sheltering a human. The portable shelter includes a front wall, a rear wall, and a top wall. The front wall has when erected an upper end, a lower end, and a height extending between the upper and lower ends, and a left end, a right end, and a width extending between the left and right ends. The front wall includes folds extending along generally parallel fold lines which extend along the height of the front wall and are spaced from each other between the left and right ends of the front wall. The folds include outboard folds and inboard folds. The outboard folds are disposed outward of the inboard folds in the erected shelter. The rear wall has when erected an upper end, a lower end, and a height extending between the upper and lower ends, and a left end, a right end, and a width extending between the left and right ends. The rear wall includes folds extending along generally parallel fold lines which extend along the height of the rear wall and are spaced from each other between the left and right ends of the rear wall. The folds include outboard folds and inboard folds. The outboard folds are disposed outward of the inboard folds in the erected shelter. The top wall has when erected a front end, a rear end, and a length extending between the front and rear ends, and a left end, a right end, and a width extending between the left and right ends. The front end of the top wall is connected to the upper end of the front wall, and the rear end of the top wall is connected to the upper end of the rear wall so the length of the top wall extends between the front and rear walls. The top wall includes folds extending along generally parallel fold lines which extend along the length of the top wall and are spaced from each other between the left and right ends of the top wall. The folds include outboard folds and inboard folds. The outboard folds are disposed outward of the inboard folds in the erected shelter.

In another aspect, the present invention is directed to a portable shelter which is erectable on a support surface for defining an interior for temporarily sheltering a human. The portable shelter includes a front wall and a floor. The front wall has when erected an upper end, a lower end, and a height extending between the upper and lower ends, and a left end, a right end, and a width extending between the left and right ends. The front wall includes folds extending along generally parallel fold lines which extend along the height of the front wall and are spaced from each other between the left and right ends of the front wall. The folds include outboard folds and inboard folds. The outboard folds are disposed outward of the inboard folds in the erected shelter. The floor is adapted for being supported above the support surface adjacent the lower end of the front wall. The floor has a front end, a rear end, and a length extending between the front and rear ends, and a left end, a right end, and a width extending between the left and right ends. The front end of the floor includes indentations which are configured for receiving lower portions of the inboard folds of the front wall.

In yet another aspect, the present invention is directed to a portable shelter which is erectable on a support surface for defining an interior for temporarily sheltering a human. The portable shelter includes a top wall and a wall adapted for connection to the top wall. The top wall when erected forms a roof above the interior. The wall adapted for connection to the top wall has when erected an upper end, a lower end, and a height extending between the upper and lower ends, and a left end, a right end, and a width extending between the left and right ends. The wall includes folds extending along generally parallel fold lines which extend along the height of the wall and are spaced from each other between the left and right ends of the wall. The folds include outboard folds and inboard folds. The outboard folds are disposed outward of the inboard folds in the erected shelter. The wall is folded along a line extending along the width of the wall to form a portion of the lower end of the wall into a generally planar foot having a generally flat bottom surface positioned for engaging said support surface in generally flatwise engagement.

Other objects and features will be in part apparent and in part pointed out hereinafter.

BRIEF DESCRIPTION OF THE DRAWINGS

FIG. 31 is a plan view of two unfolded housing components which together form a left side wall of the housing.

Corresponding reference characters indicate corresponding parts throughout the drawings.

DETAILED DESCRIPTION

Figure 1:
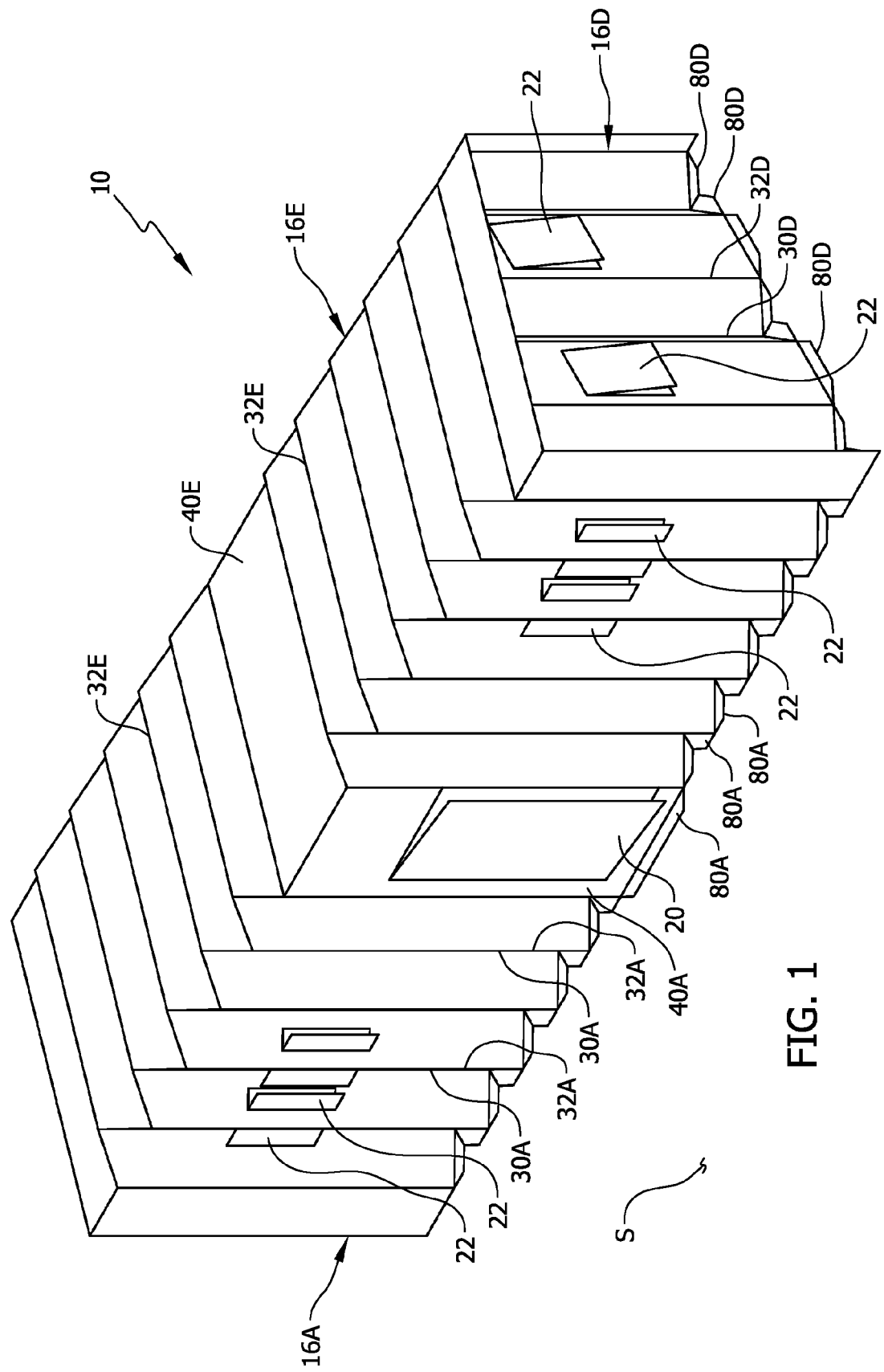
FIG. 1 is a front perspective of an embodiment of a portable shelter of the present invention.

Referring to FIG. 1, a portable shelter is generally indicated by the reference number 10. The portable shelter 10 can be used to provide housing for persons in need of short-term or long-term housing. For example, the shelter 10 may be used to provide housing for persons displaced from their homes in a natural disaster. Moreover, the shelter 10 may be used to provide housing for persons in economically challenged areas. As will become apparent, the shelter 10 may be readily transported because it is formed of components which are easily packable and lightweight. The shelter 10 may be used in other contexts without departing from the scope of the present invention.

The shelter 10 is desirably formed of material which is lightweight relative to conventional building materials such as concrete and steel. It is desirable for the material to be readily portable to locations where shelter 10 is needed. For example, lightweight sheet material which is substantially planar such as cardboard may be used. In one embodiment, the shelter 10 is formed of plastic corrugated boards such as disclosed in U.S. Pat. No. 5,658,644, the entirety of which is incorporated herein by reference. Substantially the entire shelter 10 may be formed of plastic corrugated boards. Such material is waterproof, resistant to mold, and stronger than other lightweight materials. Other materials may be used without departing from the scope of the present invention. The illustrated shelter 10 is frameless. For example, the shelter 10 does not include internal or external framing such as wood or metal studs, beams, columns, or trusses). To permit construction of the shelter 10 using lightweight sheet material (e.g., without a frame), it may be desirable to provide the shelter 10 with structural features which enhance its structural integrity. As described in further detail below, shelters constructed according to the present invention may include features which provide enhanced structural integrity.

FIGS. 1-6 illustrate various views of the shelter 10 in its fully assembled form. The shelter 10 is erectable on a support surface S (FIGS. 1, 2, and 12), such as the ground, various types of decking, or other man-made structure. As shown in FIG. 7, an exploded perspective of the shelter 10, the shelter includes a base including a foundation 12 and a floor 14. The foundation 12 has a bottom which is adapted for contacting the support surface S on which the shelter 10 is to be erected and has a top for supporting the floor 14 above the support surface. The shelter 10 also includes a housing 16. The housing 16 includes front and rear walls 16A, 16B, left and right side walls 16C, 16D, and a top wall which forms a roof 16E. The housing 16 (e.g., each housing wall 16A-16E) may be constructed of separately formed components without departing from the scope of the present invention.

The shelter 10 defines an interior above the floor 14, interior of the walls 16A-16E of the housing 16, and below the roof 16E that is sized for housing one or more humans. A door 20 in the front wall 16A selectively closes an opening which is sized for permitting a human to enter the interior. Window flaps 22 on the front, rear, and side walls 16A-16D selectively close window openings. The door 20 and window flaps 22 may be formed in the housing 16 in a suitable manner (e.g., at the time of forming the sheet material of the housing walls 16A-16D) by cutting respective generally U-shapes defining three sides of a perimeter of each of the door 20 and window flaps 22. The fourth side of the perimeter of the door 20 and window flaps 22 may remain connected to the sheet material to define a living hinge about which the door and window flaps are pivotable to selectively open and close the door and windows openings. The door 20 and window flaps 22 may have other configurations and be provided at other positions on the housing 16 without departing from the scope of the present invention. Moreover, other numbers of doors (e.g., two, three, etc.) and other numbers of windows (zero, two, three, etc.) may be used without departing from the scope of the present invention.

Figure 3:
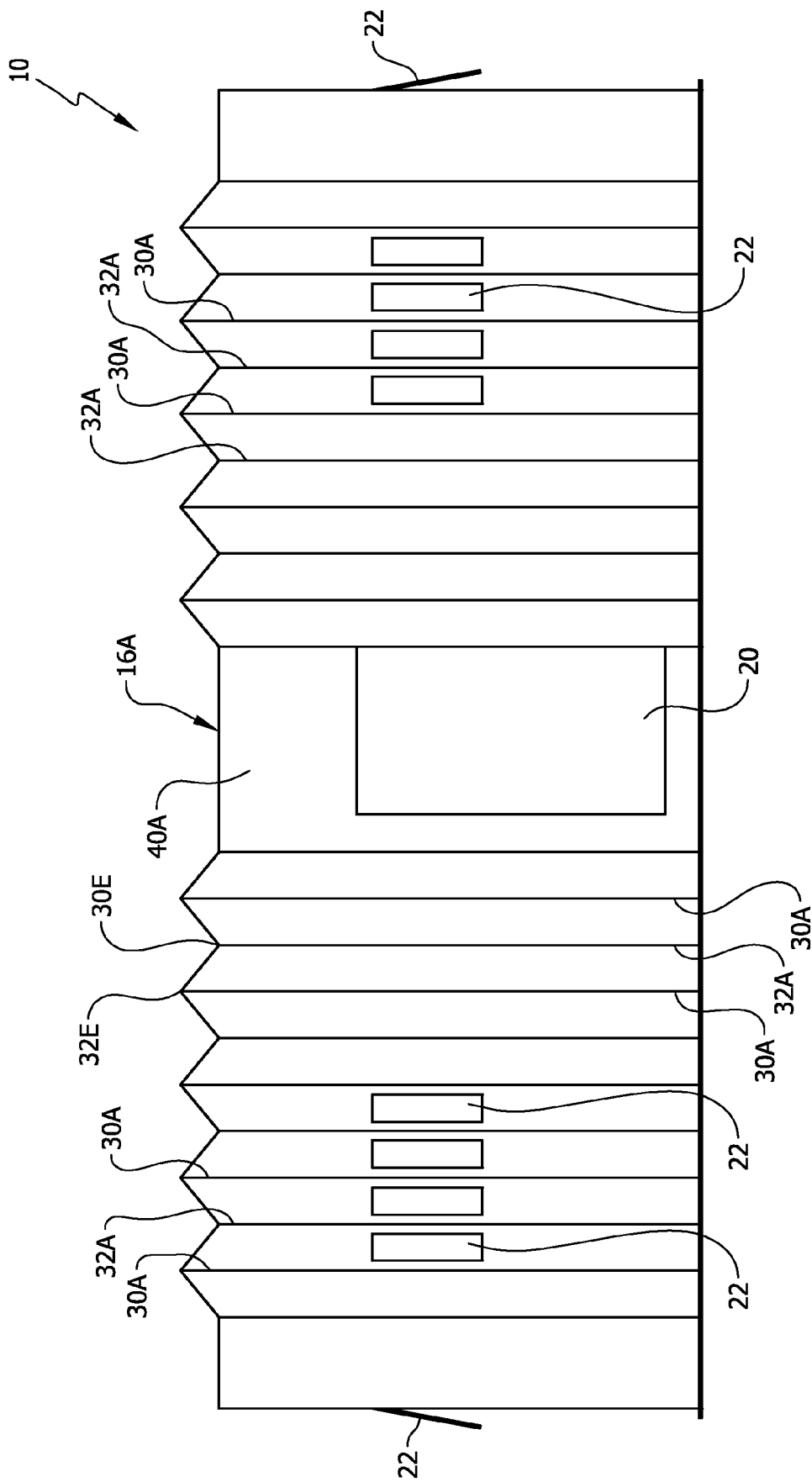
FIG. 3 is a front elevation of the portable shelter.

As shown in FIG. 3, the front wall 16A has an upper end, a lower end, and a height extending between the upper and lower ends. The front wall 16A also has a left end, a right end, and a width extending between the left and right ends. The front wall 16A includes inboard and outboard folds 30A, 32A extending along generally parallel fold lines which extend along the height of the front wall. The folds 30A, 32A are spaced from each other between the left and right ends of the front wall 16A. As shown in FIG. 1, outboard folds 32A are disposed outward of the inboard folds 30A in the erected shelter. Referring again to FIG. 3, the front wall 16A includes a generally planar central portion 40A having the door 20. The door may be provided at other locations on the front wall 16A or at any location on any of the other walls 16B-16D without departing from the scope of the present invention. In the illustrated embodiment, a plurality of the inboard and outboard folds 30A, 32A of the front wall 16A are positioned to the left of the door 20 and a plurality of the inboard and outboard folds of the front wall are positioned to the right of the door.

Figure 2:
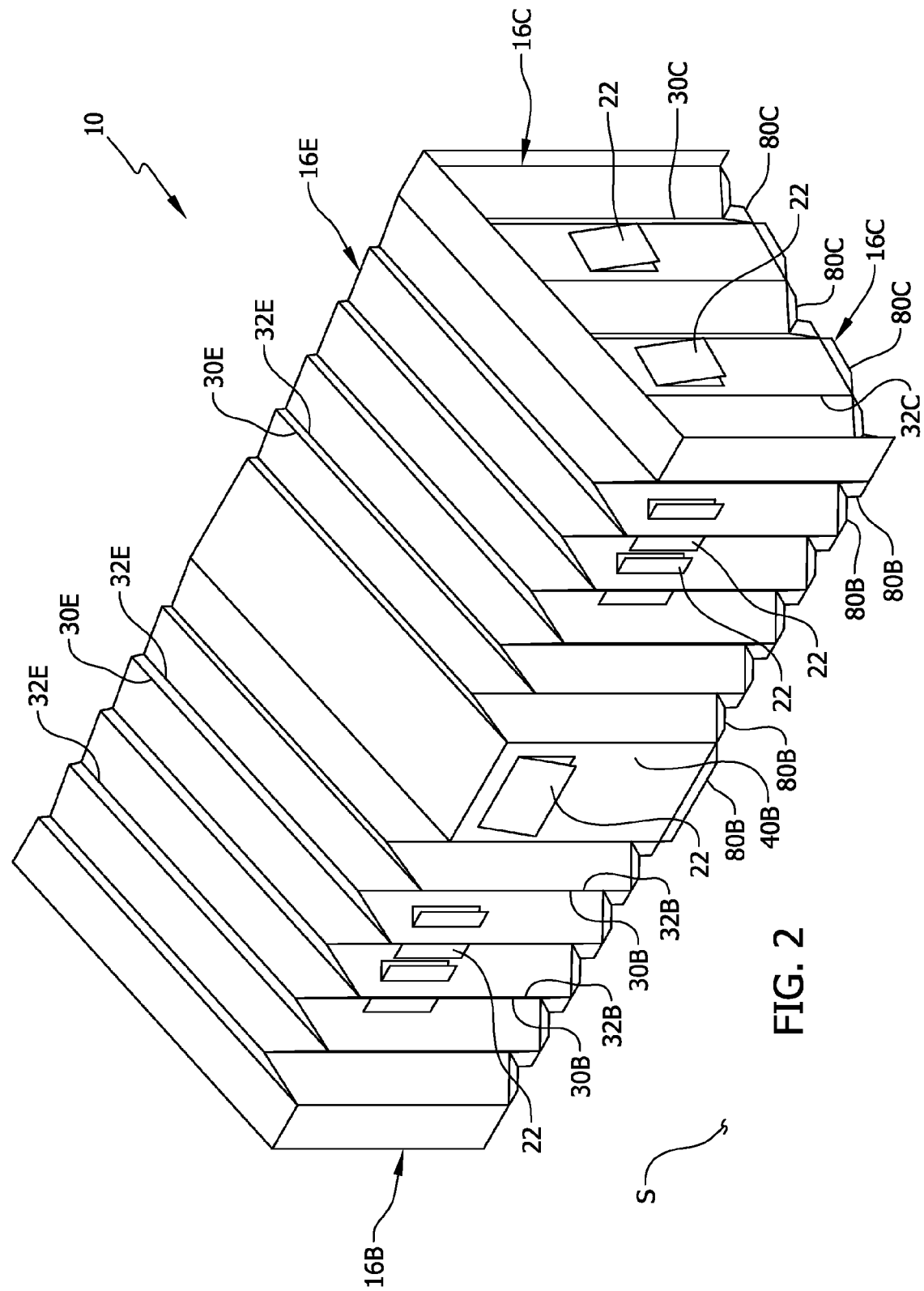
FIG. 2 is a rear perspective of the portable shelter of FIG. 1.
Figure 5:
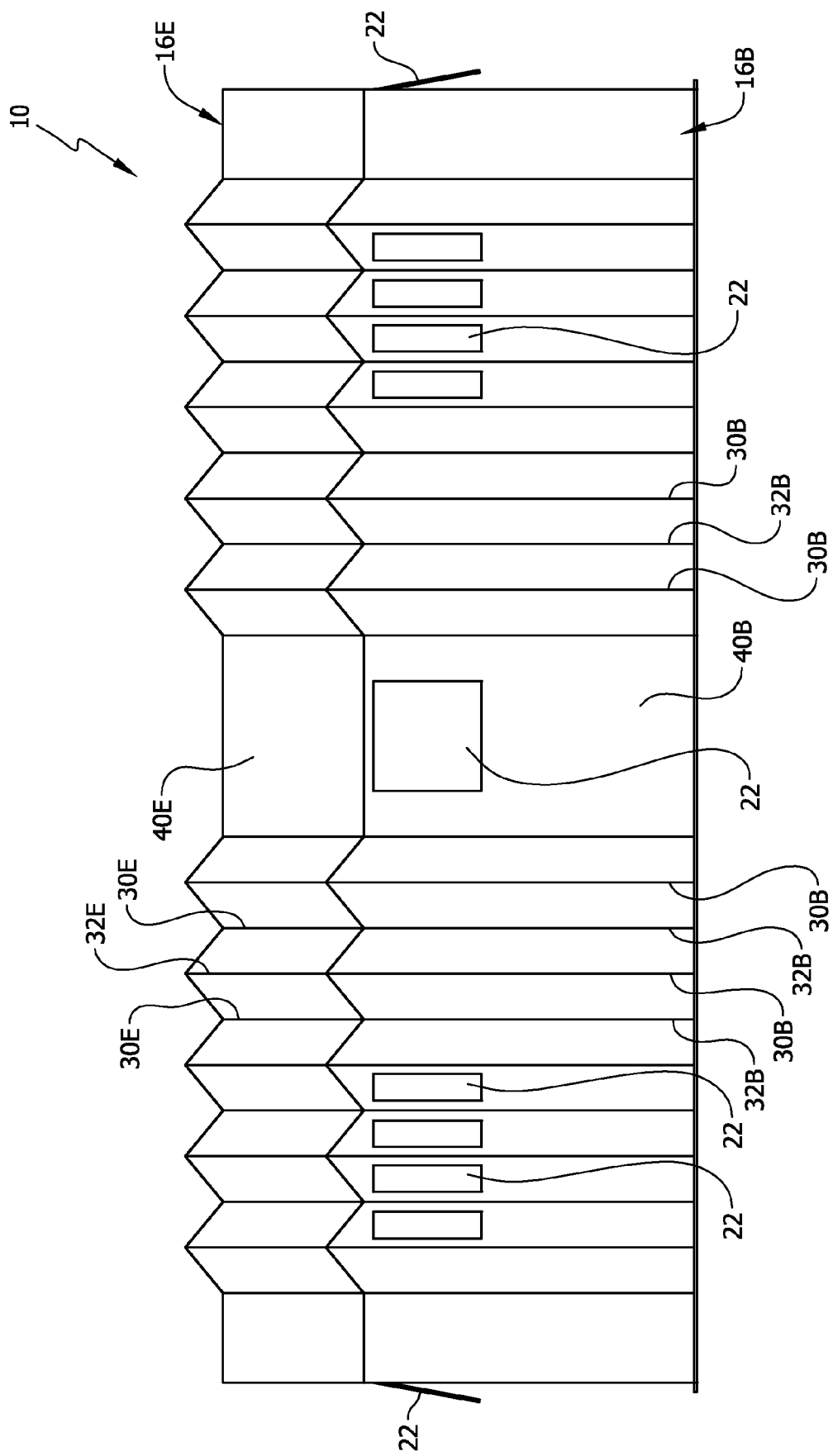
FIG. 5 is rear elevation of the portable shelter.

The rear wall 16B has a configuration similar to the front wall 16A. The rear wall 16B is shorter than the front wall 16A. As shown in FIG. 5, the rear wall 16B has an upper end, a lower end, and a height extending between the upper and lower ends. The rear wall 16B also has a left end, a right end, and a width extending between the left and right ends. The rear wall 16B includes inboard and outboard folds 30B, 32B extending along generally parallel fold lines which extend along the height of the rear wall. The folds 30B, 32B are spaced from each other between the left and right ends of the rear wall 16B. As shown in FIG. 2, the outboard folds 32B are disposed outward of the inboard folds 30B in the erected shelter 10. The rear wall 16B includes a generally planar portion 40B corresponding to the generally planar portion 40A of the front wall 16A. The rear wall 16B includes a window 22 in the generally planar portion.

Figure 4:
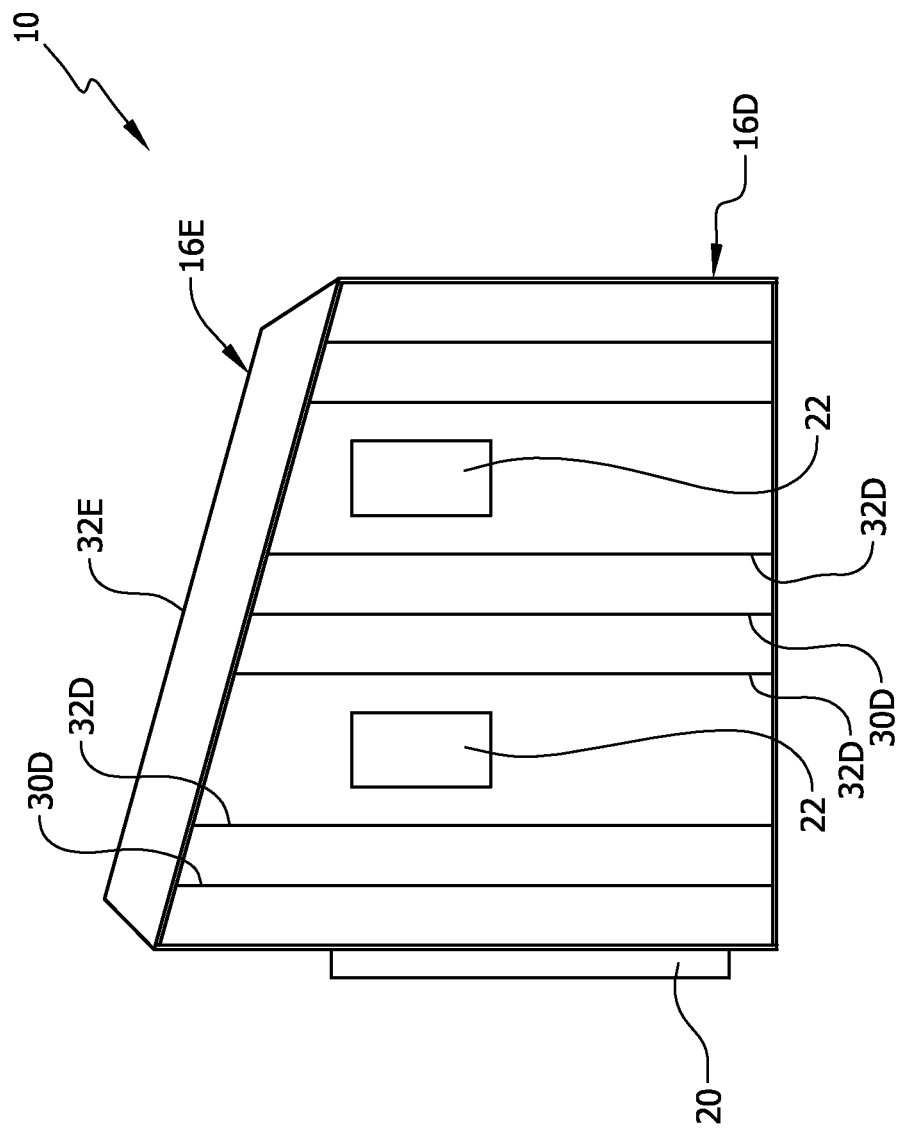
FIG. 4 is a right elevation of the portable shelter.

The right side wall 16D is shown in FIG. 4. The left and right side walls 16C, 16D are mirror images of each other. The right side wall 16D will be described in further detail with the understanding the left side wall 16C is functionally identical. For example, the left side wall 16C includes inboard and outboard folds 30C, 32C, and the right side wall 16D includes inboard and outboard folds 30D, 32D. As shown in FIG. 4, the right side wall 16D has an upper end, a lower end, and a height extending between the upper and lower ends. The side wall 16D also has a front end, a rear end, and a length extending between the front and rear ends. The front end of the side wall 16D is connected to the front wall 16A. The rear end of the side wall 16D is connected to the rear wall 16B. The top end of the side wall 16D is connected to the top wall 16E. The side wall 16D includes the inboard and outboard folds 30D, 32D extending along generally parallel fold lines which extend along the height of the side wall and are spaced from each other between the front and rear ends of the side wall. The outboard folds 32D are disposed outward of the inboard folds 30D in the erected shelter 10.

Figure 6:
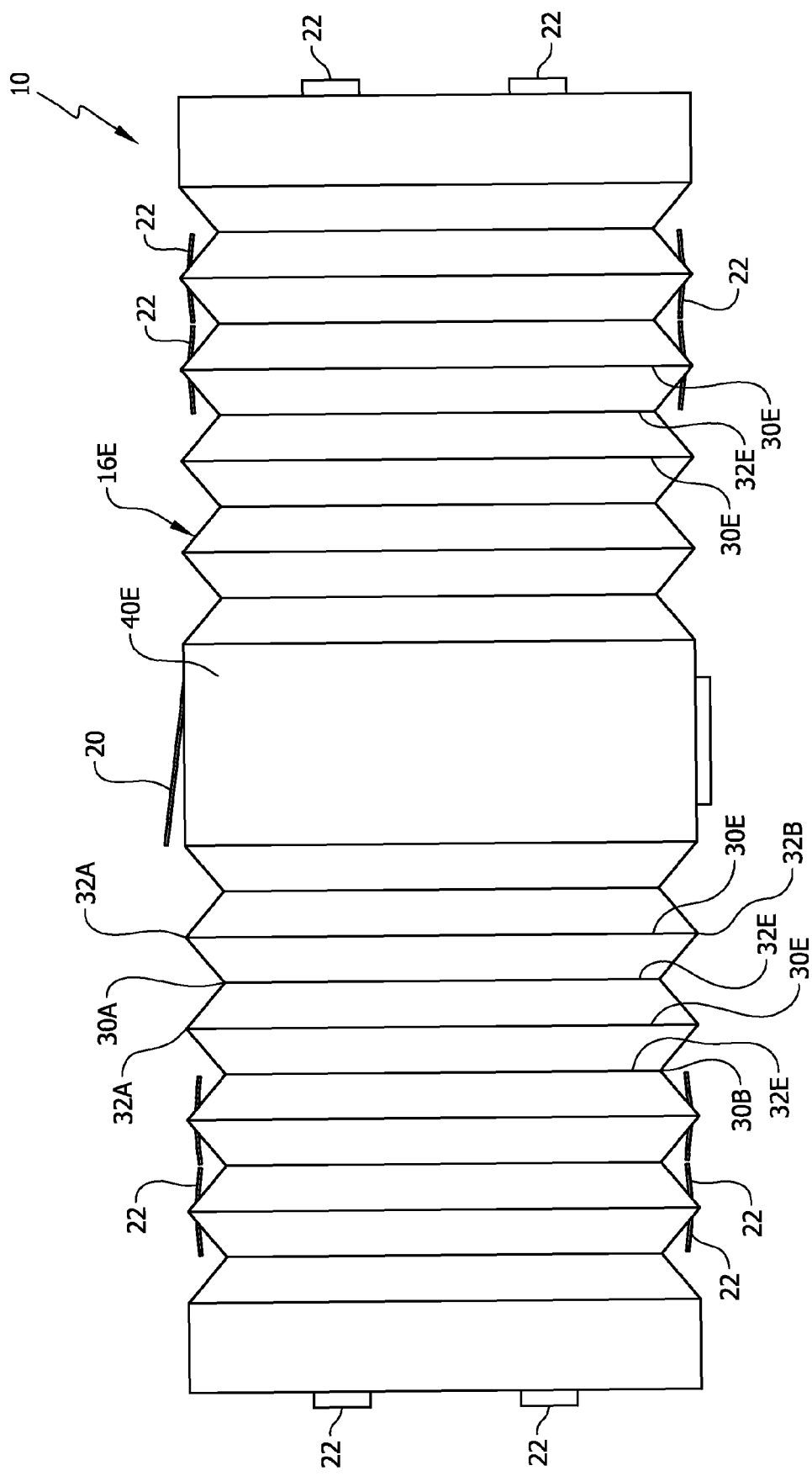
FIG. 6 is a top plan view of the portable shelter.
Figure 7:
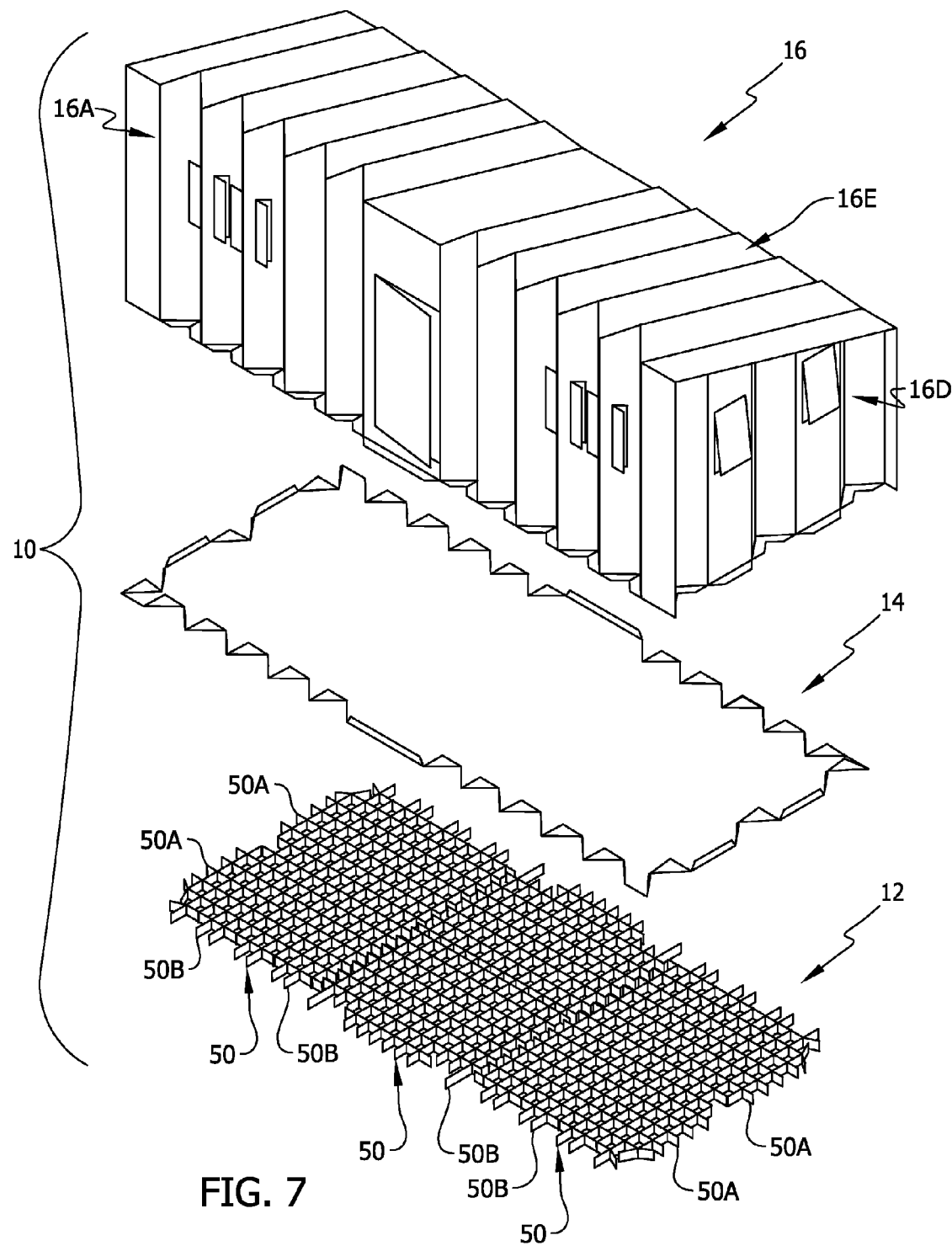
FIG. 7 is an exploded perspective of the portable shelter, the portable shelter including a foundation, a floor, and a housing.

As shown in FIG. 6, the roof 16E has a front end, a rear end, and a length extending between the front and rear ends. The roof 16E also has a left end, a right end, and a width extending between the left and right ends. The length of the roof 16E extends between the front and rear walls. The roof 16E includes a generally planar central portion 40E corresponding to the portions 40A, 40B of the front and rear walls 16A, 16B. The front end of the roof 16E is connected to the upper end of the front wall 16A, and the rear end of the roof is connected to the upper end of the rear wall 16B. As shown in FIGS. 1, 2, and 4, because the rear wall 16B is shorter than the front wall 16A, the roof 16E is sloped downward (broadly "non-horizontal") along the length of the roof from the front wall toward the rear wall in the erected shelter 10. Desirably, the slope is sufficient to cause water to drain from the roof 16E. For example, the roof 16E may have a slope between about 15 degrees and about 45 degrees, or more preferably between about 18 degrees and about 30 degrees. Roofs having other slopes or no slope may be used without departing from the scope of the present invention. The width of the roof 16E extends between the left and right side walls 16C, 16D. The left and right ends of the roof 16E are connected to the upper ends of the left and right side walls 16C, 16D, respectively. The roof 16E includes inboard and outboard folds 30E, 32E extending along generally parallel fold lines which extend along the length of the roof. The folds 30E, 32E are spaced from each other between the left and right ends of the roof 16E. As shown in FIGS. 2 and 3, the outboard folds 32E are disposed outward of the inboard folds 30E in the erected shelter 10. The outboard and inboard folds 30E, 32E have lengths extending between the front and rear walls 16A, 16B. As shown in FIG. 6, the outboard folds 32E are shorter than the inboard folds 30A. The roof 16E has a length such that the outboard folds 32E are at least half as long as the inboard folds 30E. Roofs having other configurations may be used without departing from the scope of the present invention. For example, the roof 16E may have a peak or apex at an intermediate portion of the roof such that the roof slopes in opposing directions along the length and/or width of the roof.

In the illustrated embodiment, the housing 16 may be formed of blanks of sheet material which are then folded to form the inboard and outboard folds 30A-30E, 32A-32E. The door 20 and window flaps 22 may be formed at the time of forming the blanks by cutting the blanks to define the door and window flaps. The front wall 16A, roof 16E, and rear wall 16B, may be formed of a single piece of sheet material. In such a case, the housing 16 may be formed by folding the sheet material along its length to form the inboard and outboard folds 30A-30E, 32A-32E of the roof 16E and front and rear walls 16A, 16B. The sheet material may then be folded along fold regions along its width to form a generally upside-down U shape to define the front wall 16A, roof 16E, and rear wall 16B. Accordingly, the upper end of the front wall 16A is connected to the front end of the roof 16E, and the upper end of the rear wall 16B is connected to the rear end of the roof. Moreover, upper ends of the inboard folds 30A of the front wall 16A are in register with front ends of respective outboard folds 32E of the roof 16E, and upper ends of the outboard folds 32A of the front wall are in register with front ends of respective inboard folds 30E of the roof. In addition, upper ends of the inboard folds 30B of the rear wall 16B are in register with rear ends of respective outboard folds 32E of the roof 16E, and upper ends of the outboard folds 32B of the rear wall 16B are in register with rear ends of respective inboard folds 30E of the roof. In the illustrated embodiment, the side walls 16C, 16D may be formed separately from the front wall 16A, roof 16E, and rear wall 16B and connected to the walls during erection of the shelter 10. Alternatively, the side walls 16C, 16D may be formed as part of the same blank defining the front wall 16A, roof 16E, and rear wall 16B and be folded into position during erection of the shelter 10.

The inboard and outboard folds 30A-30E, 32A-32E of the components of the housing 16 may be folded at various angles or to various degrees. For example, the inboard folds 30A-30E and/or outboard folds 32A-32E may form angles between about 50 degrees to about 135 degrees, and more desirably between about 75 degrees and about 120 degrees. The inboard folds 30A-30E and outboard folds 32A-32E in the front and rear walls 16A, 16B, left and right side walls 16C, 16D, and/or top wall 16E may be folded to form substantially the same or different angles. Moreover, in some embodiments, certain of the walls may not have inboard or outboard folds without departing from the scope of the present invention. In general, the shelter 10 will have greater strength and structural stability as the degree of the folds decreases. However, more material (e.g., wider or longer sheet material) is needed to form the shelter 10 as the degree of the folds decreases.

Although not illustrated, a vent may be provided in the housing 16 to permit ventilation. A vent may be provided in any of the walls 16A-16E. For example, a vent may be provided adjacent the upper end of one or more of the front, rear, or side walls 16A-16D.

Figure 8:
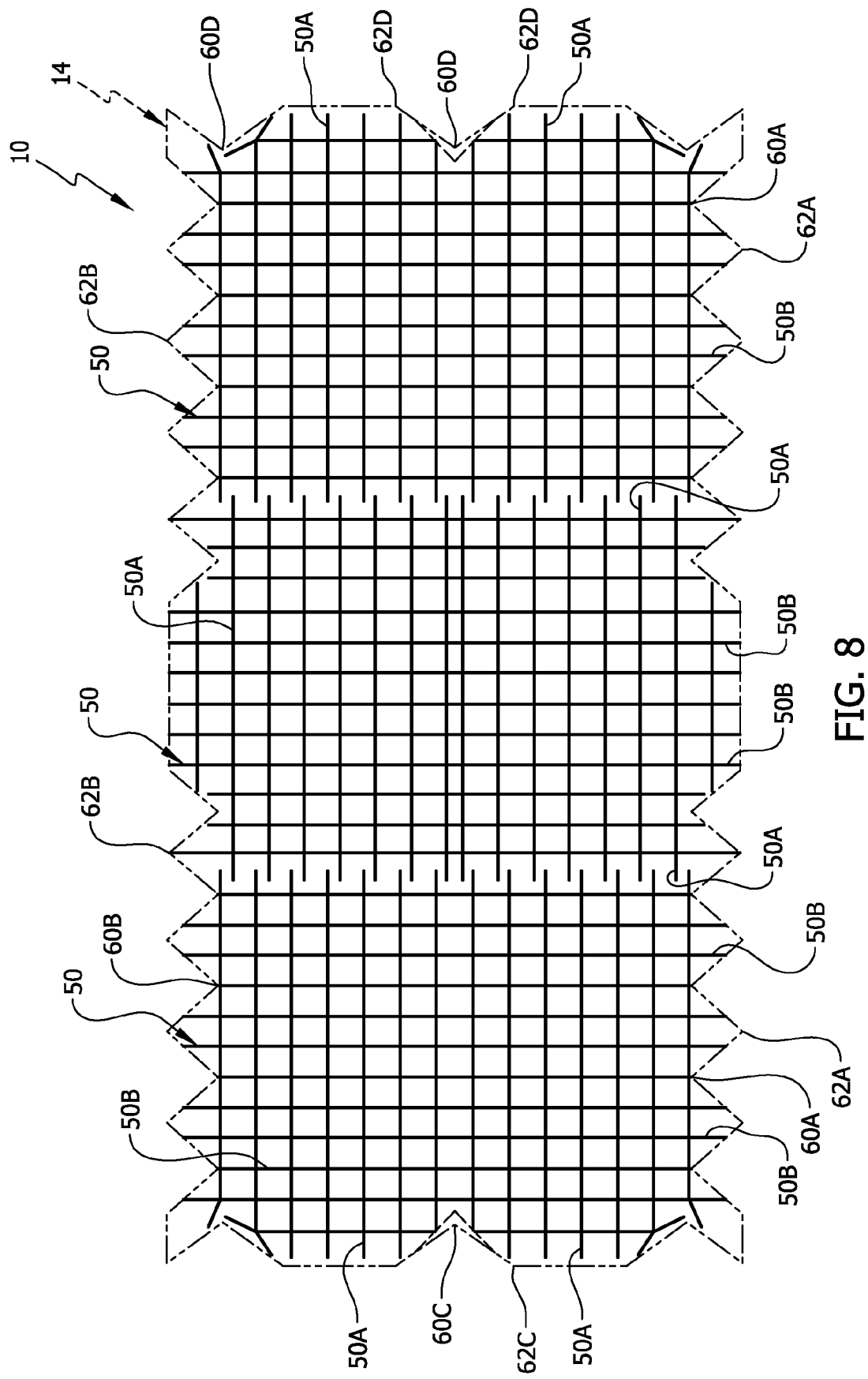
FIG. 8 is a plan view of the foundation, the floor perimeter being shown in phantom.

Referring now to FIGS. 7 and 8, the foundation 12 is formed by three grids 50 each including a plurality of runners 50A and a plurality of slats 50B. The grids 50 each have a bottom adapted for resting on a support surface S, such as the ground. The grids 50 each have a top adapted for supporting the floor 14 at a height above the support surface S corresponding to the height of the runners 50A and slats 50B. The runners 50A and slats 50B are adapted for connection to each other at spaced apart locations to form the grids 50. For example, the runners 50A and slats 50B may connect to each other by engaging slots in the runners with slots in the slats. For example, the grids 50 may be constructed as disclosed in U.S. patent application Ser. No. 13/039,115, which is hereby incorporated by reference in its entirety. Other constructions may be used to form the grids 50 without departing from the scope of the present invention. For example, a single grid rather than separate grids may be used. Foundations having other configurations (e.g., not including a grid) may be used and the foundation may be omitted without departing from the scope of the present invention.

Figure 9:
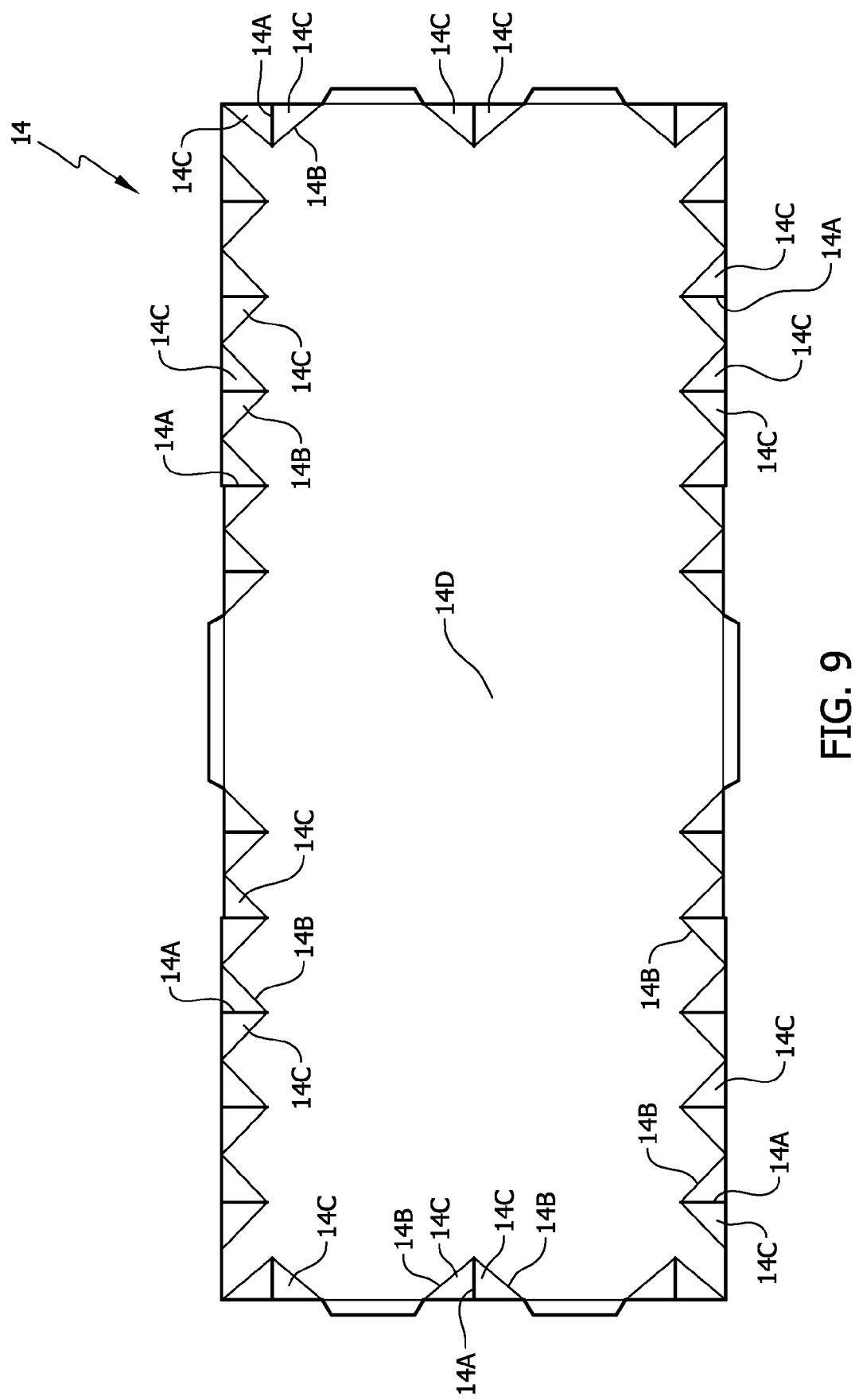
FIG. 9 is a plan view of the floor.

The floor 14 is shown in plan view in an un-erected state in FIG. 9. The floor 14 has a front end, a rear end, and a length extending between the front and rear ends. The floor also has a left end, a right end, and a width extending between the left and right ends. The floor 14 is sized and shaped to be positionable below the roof 16E and interior of the front, rear, and side walls 16A-16D. The floor 14 defines the bottom of the interior of the portable shelter 10.

The floor 14 is adapted for mating with the inboard folds 30A-30D of the front, rear, and side walls 16A-16D to enhance the structural integrity of the portable shelter 10. As shown in FIG. 9, the floor includes a plurality of cuts 14A and fold regions 14B which define flaps 14C which are foldable relative to a primary central portion 14D of the floor 14 to define indentations 60A-60D in the front, rear, left, and right ends of the floor. The fold regions 14B may be formed by score lines. For example, the floor 14 may be formed as a blank having the shape shown in FIG. 9, and at the time of forming the blank, the cuts 14A and score lines 14B may be formed.

Figure 10:
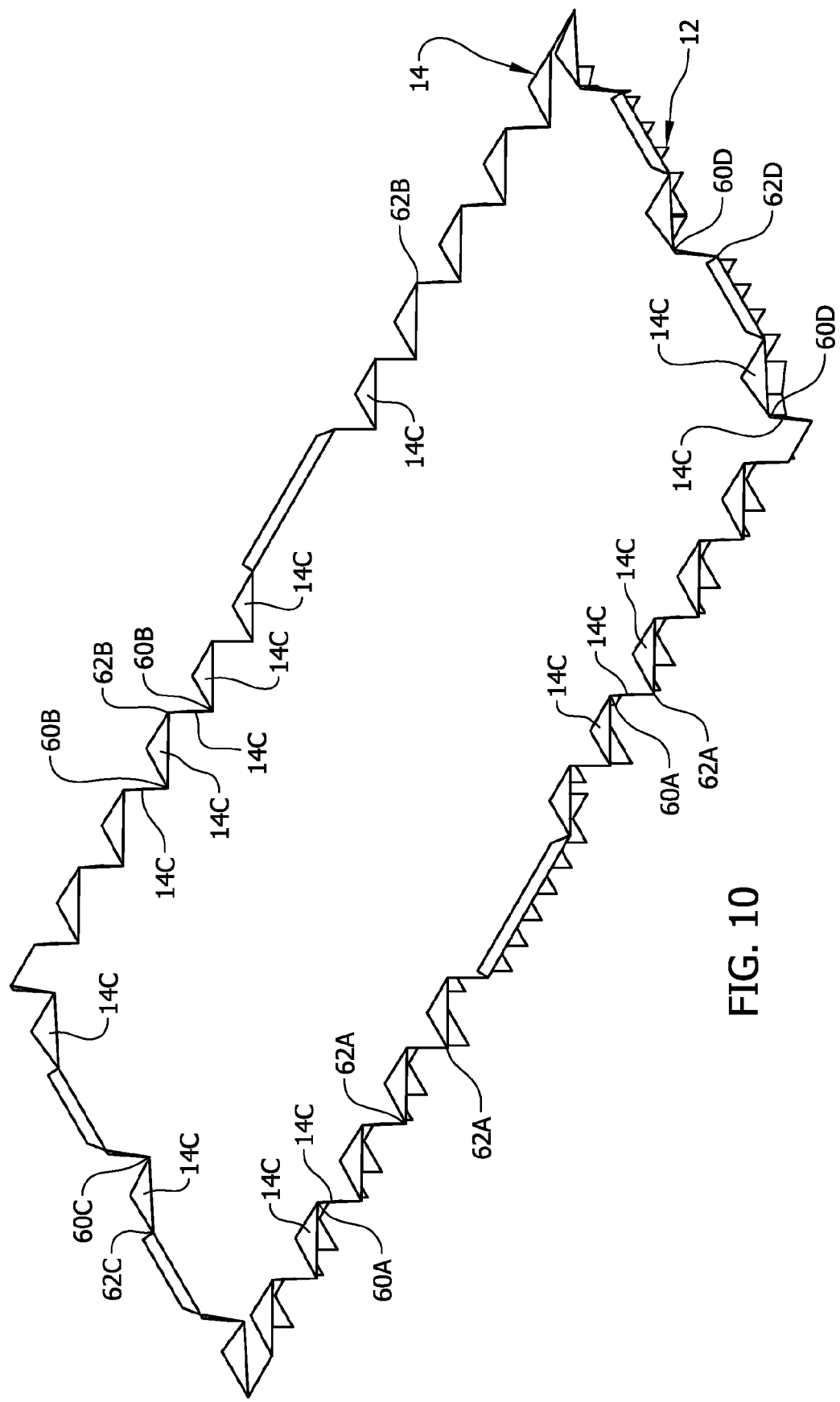
FIG. 10 is a perspective of the floor on the foundation positioned on a support surface, flaps of the floor being folded upward to create indentations in the floor adapted for receiving folds of the housing walls.

As shown in FIGS. 8 and 10, the flaps 14C are foldable about the fold regions 14B to define the indentations 60A-60D in the front, rear, left, and right ends of the floor 14. When the flaps 14C are folded, the floor 14 has a footprint as shown in phantom in FIG. 8. The indentations 60A-60D in the floor 14 are configured for receiving lower portions of the inboard folds 30A-30D of the front wall, rear wall, and side walls 16A-16D of the housing 16. The foundation 12 has a perimeter having a corresponding shape to permit the inboard folds 30A-30D of the housing walls 16A-16D to mate with the indentations 60A-60D in the floor 14. When the floor flaps 14C are folded, the floor 14 also defines protrusions 62A-62D adjacent the indentations 60A-60D. The protrusions 62A-62D each have a profile which closely conforms to an inner profile of respective outboard folds 32A-32D of the housing walls 16A-16D so lower portions of the outboard folds mate with the protrusions.

Figure 11:
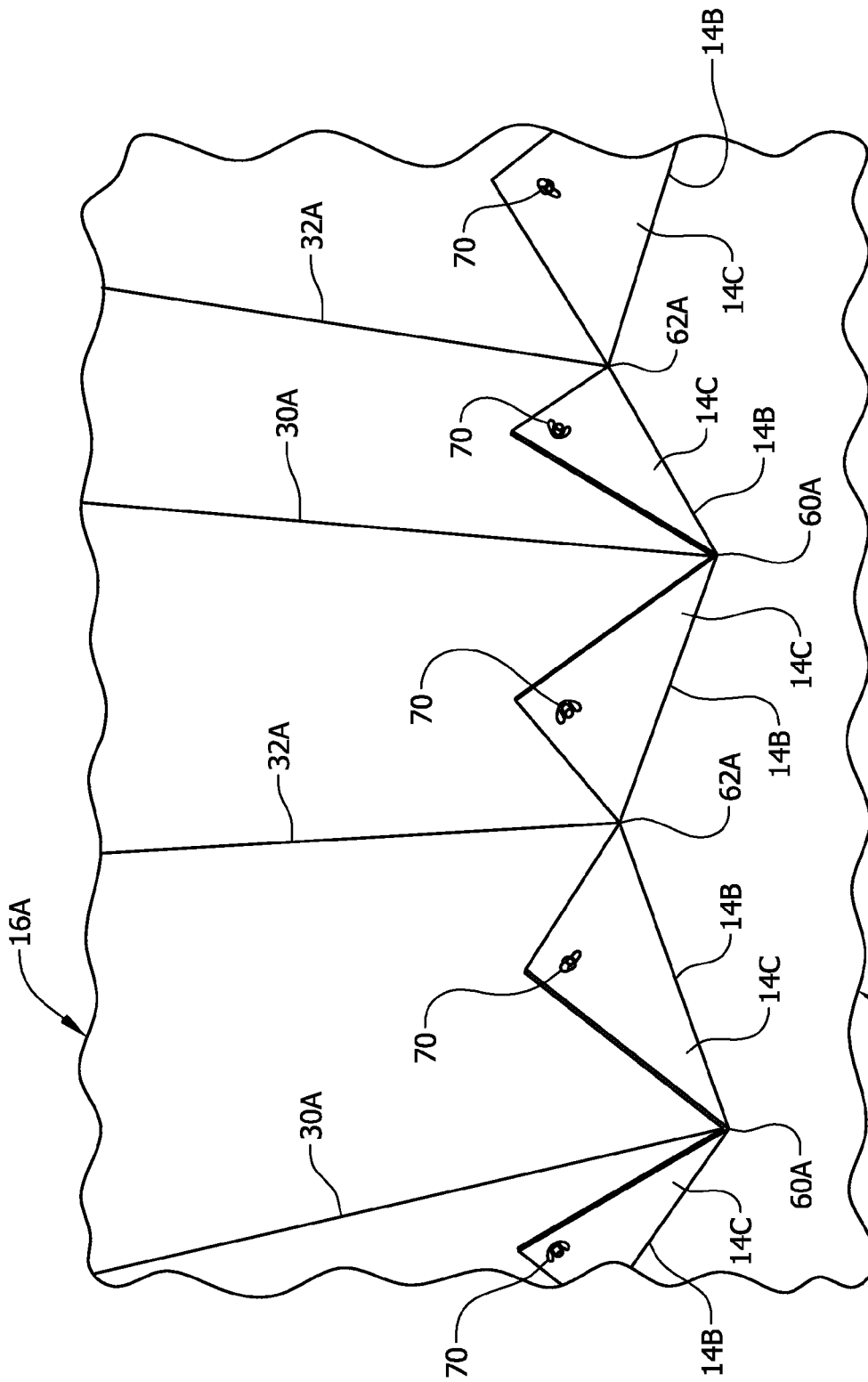
FIG. 11 is a fragmentary perspective from inside the an interior of the shelter showing folds of the housing received in indentations of the floor and flaps of the floor fastened to the housing.

FIG. 11 is a fragmentary perspective view from the interior of the shelter 10 showing engagement of a portion of the front end of the floor 14 with a lower portion of the front wall 16A. It will be understood engagement of the rear and side walls 16B-16D with the floor 14 is functionally identical in this embodiment. Inboard folds 30A of the front wall 16A are mated with indentations 60A in the front end of the floor 14. Moreover, protrusions 62A of the front end of the floor 14 are mated with outboard folds 32A of the front wall 16A. The floor flaps 14C which were folded to form the indentations 60A extend upward from the primary central portion 14D of the floor 14. The floor flaps 14C form an upstanding portion of the floor 14 adjacent the indentations 60A having outer surfaces adapted for engaging and being fastened to inner surfaces of the front wall 16A in generally flatwise engagement. As shown in FIG. 11, flaps 14C are fastened by fasteners 70 (e.g., each including a bolt, a washer, and a wing nut) to the front wall 16A on opposite left and right sides of inboard folds 30A to secure the inboard folds in the indentations 60A. It will be understood, in similar fashion, the indentations 60B-60D in the rear, left, and right ends of the floor 14 mate with inboard folds 30B-30D of the respective rear, left, and right walls 16B-16D of the housing 16, and respective flaps 14C are fastened to the walls to secure the inboard folds in the indentations. Floors having other configurations may be used and the floor may be omitted without departing from the scope of the present invention.

Figure 12:
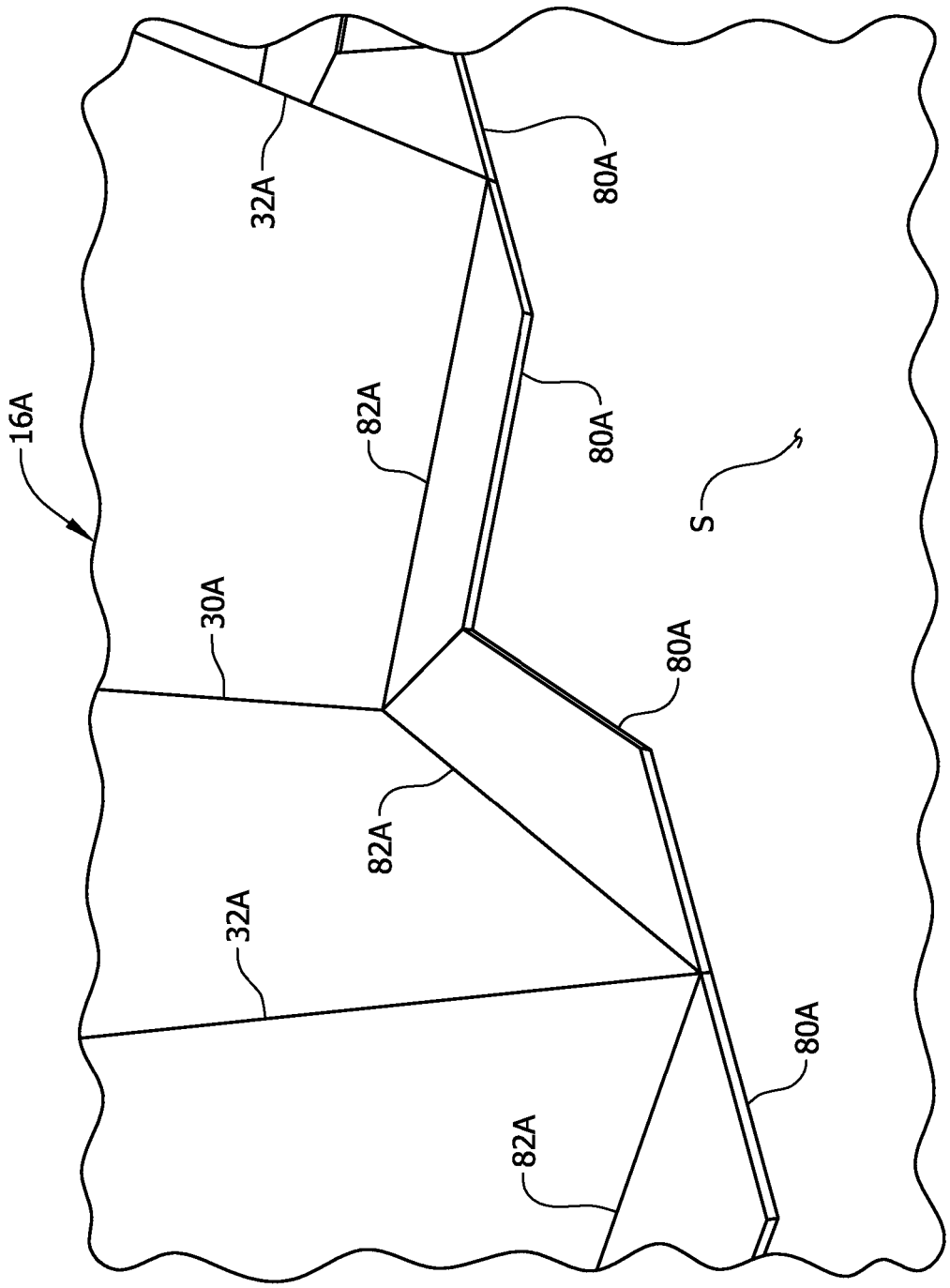
FIG. 12 is a fragmentary perspective from outside the shelter showing feet formed at the bottom of the housing in generally flatwise engagement with the support surface.

Referring now to FIG. 12, a lower portion of the front wall 16A is shown in perspective from outside the shelter 10. The front wall 16A includes feet 80A which are adapted for engaging the support surface S to provide additional structural integrity to the shelter 10. As shown, for example, in FIGS. 1 and 2, the rear, left, and right walls 16B-16D of the housing 16 also include such feet 80B-80D. The feet 80A on the front wall 16A will be described with the understanding the feet 80B-80D on the other walls 16B-16D are functionally identical. The feet 80A are formed by folding lower portions of the front wall 16A along fold regions 82A extending along the width of the front wall. The feet 80A are generally planar portions of the front wall 16A positioned to have a flat bottom surface S for engaging the support surface in generally flatwise engagement. In the illustrated embodiment, the feet 80A have a width which extends between adjacent inboard and outboard folds 30A, 32A. The feet 80A-80D of the front, rear, and side walls 16A-16D serve as footings for the walls and provide additional structural integrity to the shelter 10. Feet having other configurations may be used, and feet may be omitted from one or more of the walls, without departing from the scope of the present invention.

Figure 13:
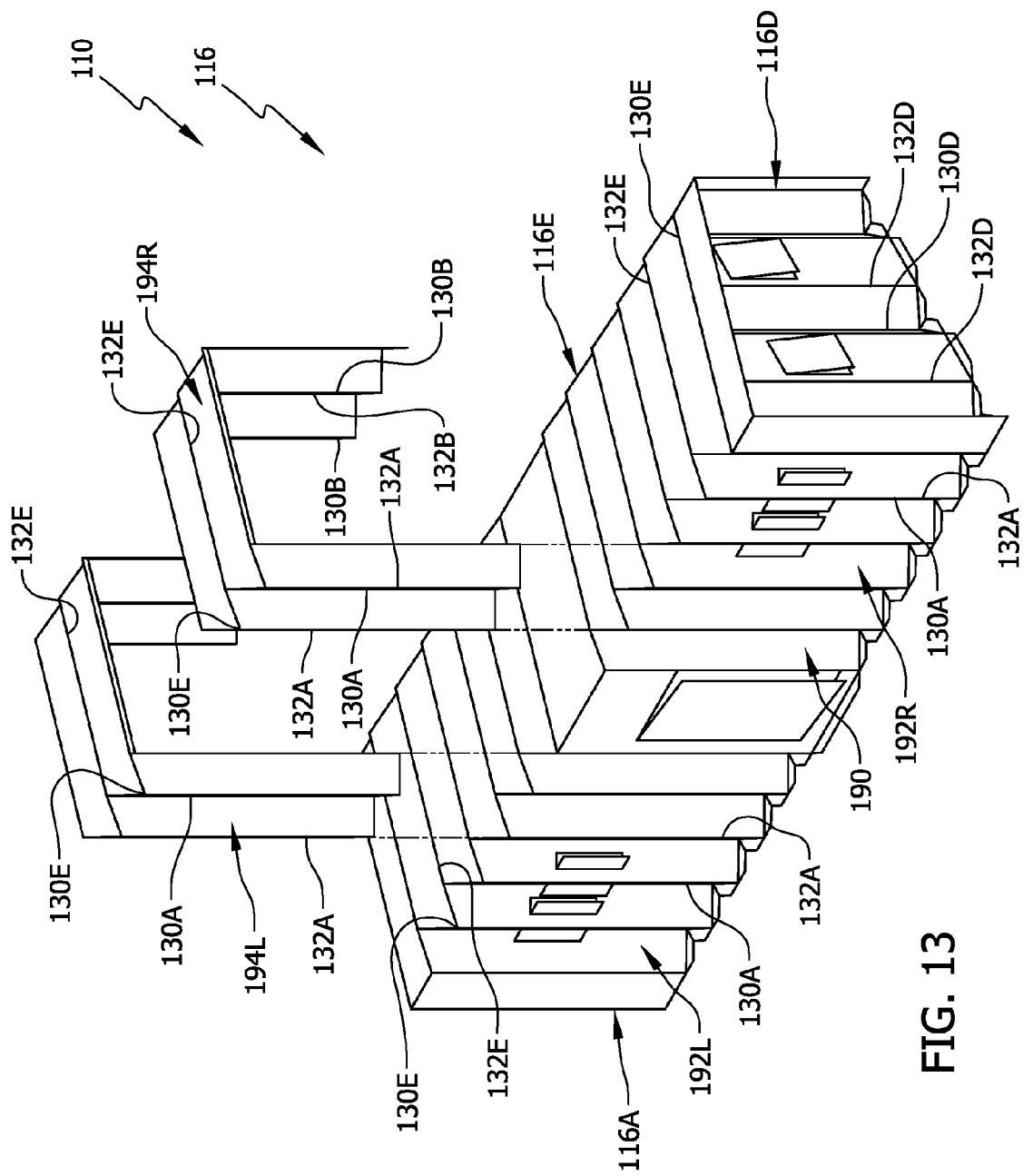
FIG. 13 is a partially exploded perspective of a second embodiment of a shelter of the present invention.

Referring to FIG. 13, a second embodiment of a portable shelter of the present invention is designated generally by the reference number 110. The portable shelter is essentially identical to the shelter 10 described above except as described hereafter. For example, the shelter 110 includes a housing 116 having walls (only the front wall 116A, right side wall 116D, and roof 116E being shown) including inboard and outboard folds (only the folds 130A, 132A, 130D, 132D, 130E, 132E being shown). In this embodiment, the housing 116 is formed of multiple separately formed housing components. More specifically, the housing includes a central housing component 190, a left side housing component 192L, and a right side housing component 192R. The central housing component 190 includes the door 120 and a rear window flap 122. The left and right side housing components 192L, 192R are essentially identical to each other and include window flaps 122. The housing 116 also includes intermediate left and right side housing components 194L, 194R. FIG. 13 illustrates the housing 116 in an exploded state, the intermediate left and right side housing components 194L, 194R raised above the housing 116. As explained in further detail below, the intermediate left and right side housing components 194L, 194R overlap respective portions of the central and left and right side housing components 190, 192L, 192R. Each housing component 190, 192L, 192R, 194L, 194R forms a portion of the front wall 116A, roof 116E, and rear wall 116B of the housing 116.

Figure 14:
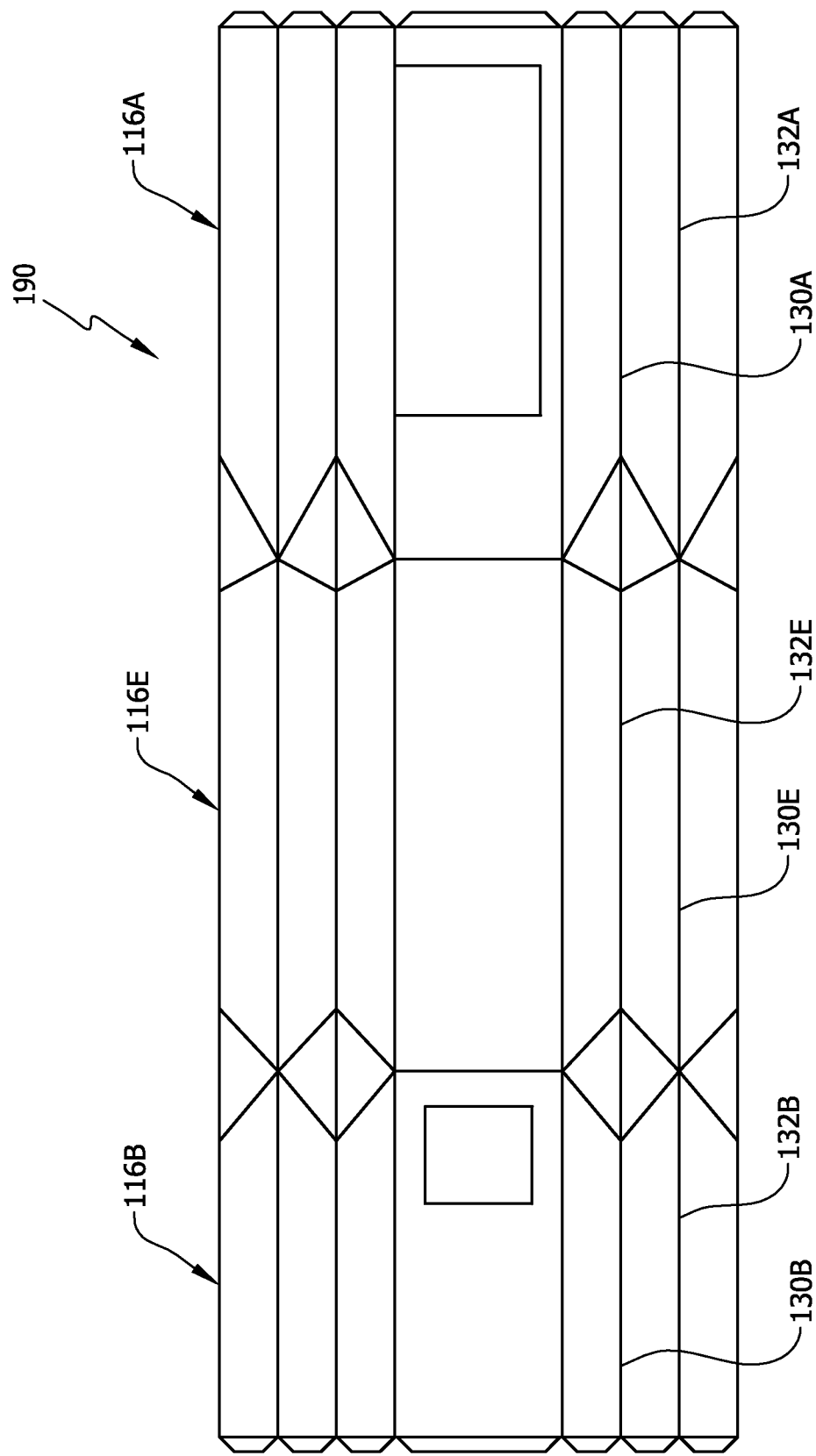
FIG. 14 is a plan view of a first unfolded housing component of the shelter of FIG. 13, the housing component including a door and a window.
Figure 15:
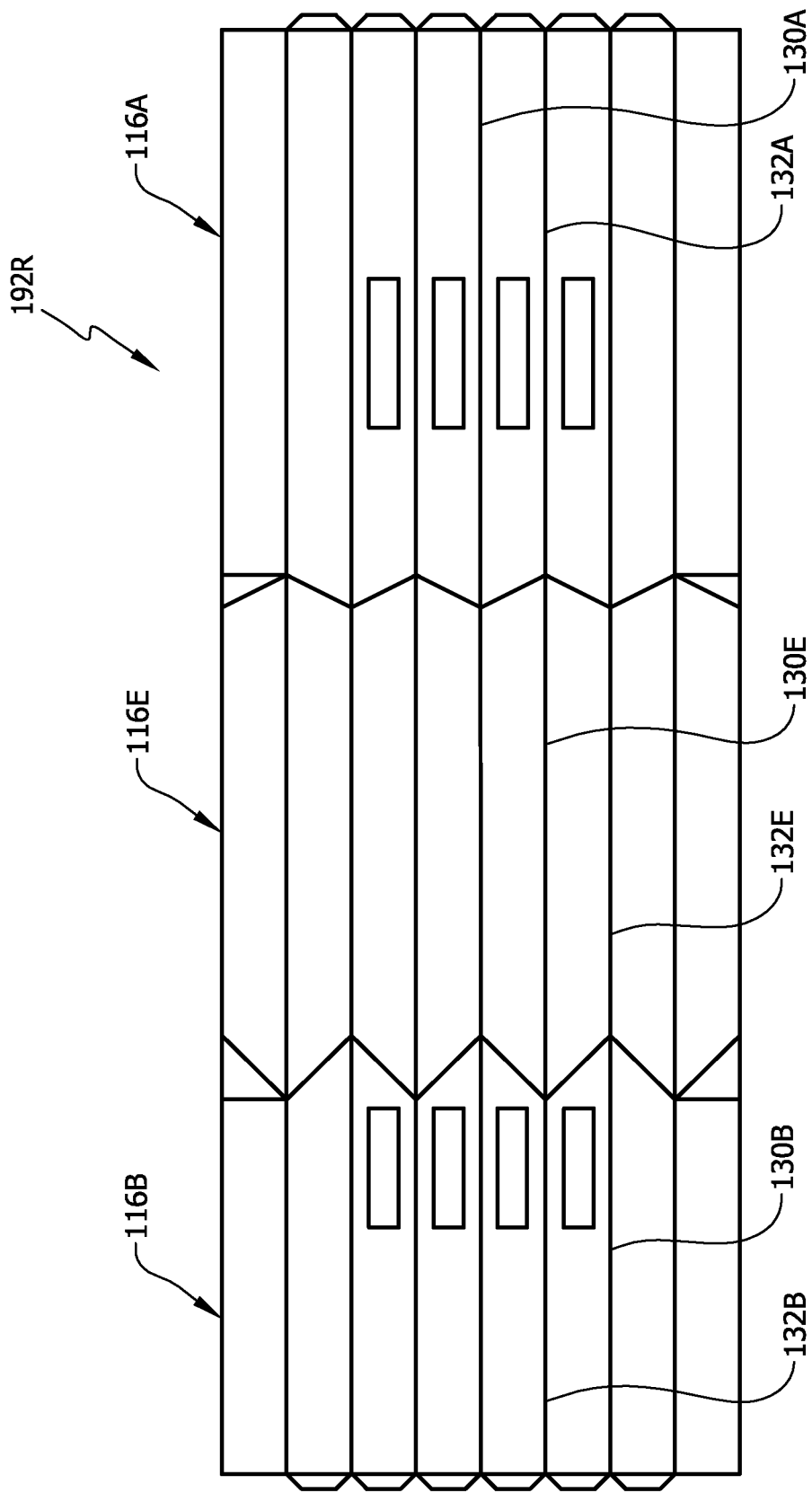
FIG. 15 is a plan view of a second unfolded housing component of the shelter of FIG. 13, the housing component including a plurality of windows.
Figure 16:
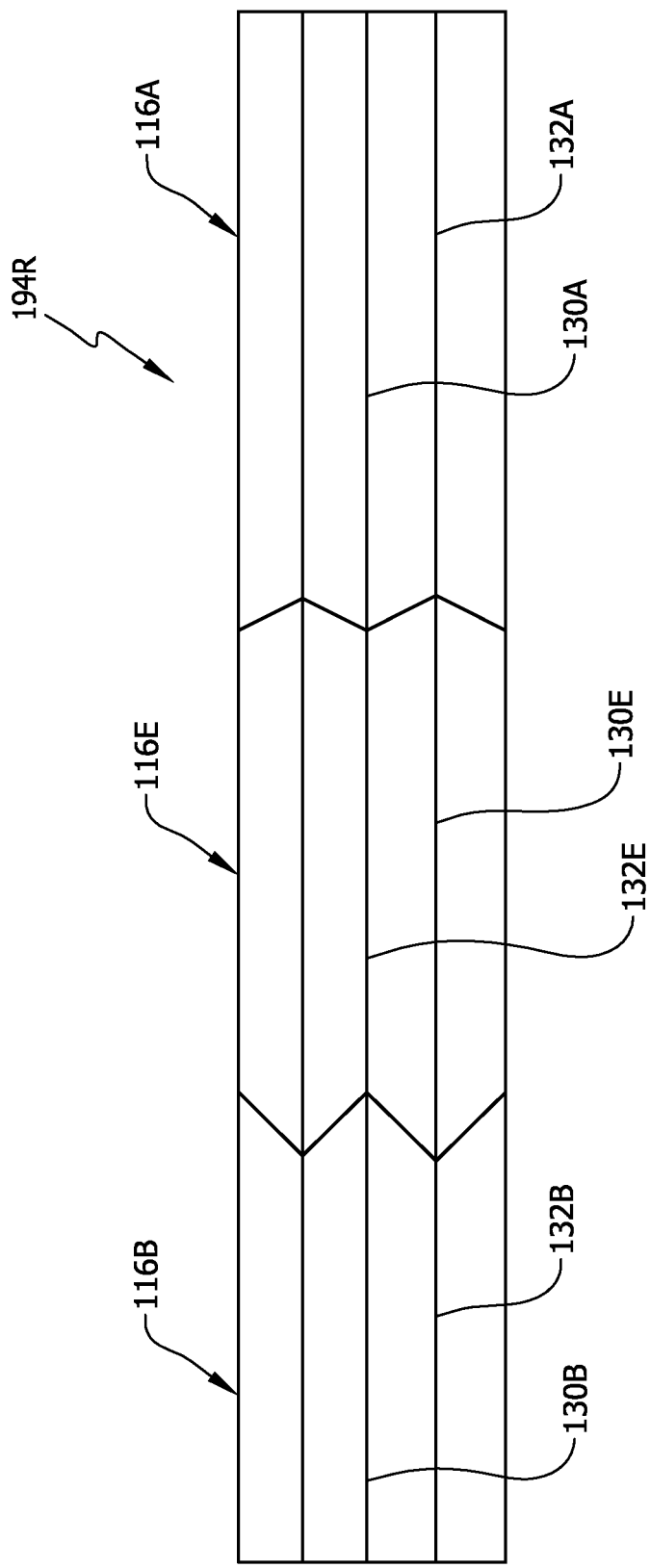
FIG. 16 is a plan view of a third unfolded housing component of the shelter of FIG. 13, the housing component being adapted for when erected overlapping the components of FIGS. 14 and 15.

Each of the housing components 190, 192L, 192R, 194L, 194R may be formed as separate blanks. For example, FIG. 14 illustrates a plan view of a blank of the central housing component 190. The central housing component 190 is shown in an unfolded state. Example fold regions are shown for folding the central housing component 190 for forming inboard and outboard folds 130A, 132A, 130B, 132B, 130E, 132E and for forming portions of the front wall 116A, roof 116E, and rear wall 116B. The blank may be scored along the fold regions to facilitate folding of the blank. FIG. 15 illustrates a plan view of the right side housing component 192R. Example fold regions are illustrated for forming inboard and outboard folds 130A, 132A, 130B, 132B, 130E, 132E and for forming portions of the front wall, roof, and rear wall 116A, 116E, 116B. It will be understood the left side housing component 192L may be essentially identical. FIG. 16 illustrates a plan view of the intermediate right side housing component 194R. Example fold regions are illustrated for forming inboard and outboard folds 130A, 132A, 130B, 132B, 130E, 132E and for forming portions of the front wall, roof, and rear wall 116A, 116E, 116B. It will be understood the intermediate left side housing component 194L may be essentially identical. Although not shown, it will be understood the left and right side walls 116C, 116D may be formed as generally planar blanks having fold regions for forming inboard and outboard folds 130C, 132C, 130D, 132D. Moreover, the side walls 116C, 116D may be constructed using more than one housing component.

The modular construction of the housing 116 including the separately formed housing components 190, 192L, 192R, 194L, 194R facilitates packing and transportation of the portable shelter 110. The intermediate housing components 194L, 194R are provided for bridging respective joints of the central housing component 190 with the left and right side housing components 192L, 192R. In the illustrated embodiment, the central housing component 190 abuts the right side of the left side housing component 192L and abuts the left side of the right side housing component 192R. In other words, gaps are not provided between the central housing component 190 and the left side and right side housing components 192L, 192R. However, gaps may be provided between the central and left and right side housing components 190, 192L, 192R without departing from the scope of the present invention.

Figure 17:
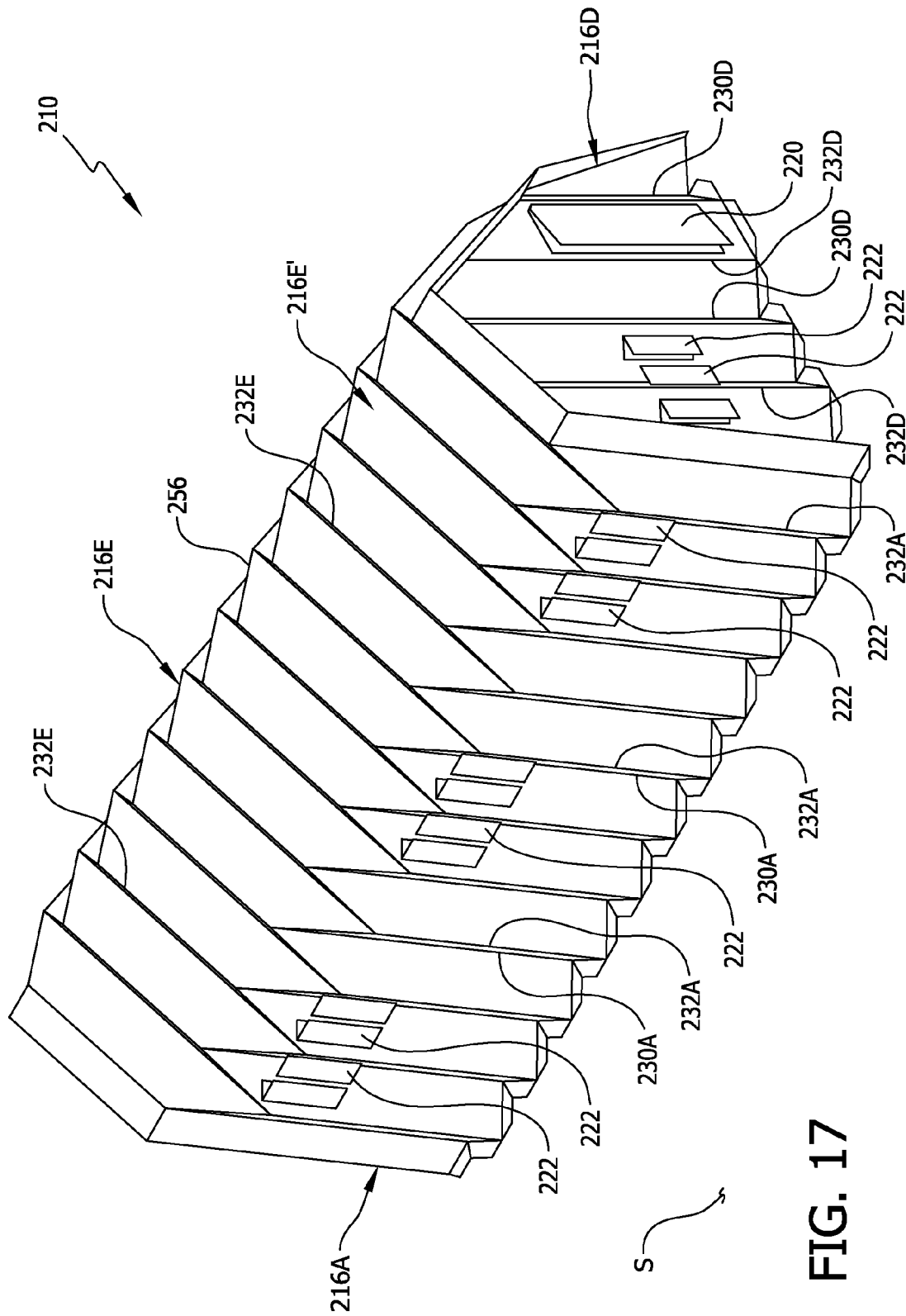
FIG. 17 is a front perspective of a third embodiment of a portable shelter of the present invention.

When the intermediate left and right side housing components 194L, 194R are in position overlapping portions of the central and left and right side housing components 190, 192L, 192R, inboard folds 130A, 130E, 130B of the intermediate housing components 194L, 194R nest with corresponding inboard folds 130A, 130E, 130B of the central and left and right side housing components 190, 192L, 192R. In other words, at least one inboard fold 130A, 130E, 130B of each of the intermediate left and right side housing components 194L, 194R engages a corresponding inboard fold 130A, 130E, 130B of the central housing component 190. In addition, at least one of the inboard folds 130A, 130E, 130B of the intermediate left and right side housing components 194L, 194R engage a corresponding inboard fold 130A, 130E, 130B of the left side and right side housing components 192L, 192R. The intermediate housing components 194L, 194R provide additional structural integrity to the portable shelter 110 and assist in preventing flow of air or moisture into or out of the interior of the shelter between the central housing component 190 and the left and right side housing components 192L, 192R. Referring to FIG. 17, a third embodiment of a portable shelter of the present invention is designated generally by the reference number 210. The portable shelter is functionally identical to the shelter 10 described above except as described hereafter. For example, the shelter 210 includes a foundation 212, a floor 214 (formed by three floor pieces 214'-214'''), and a housing 216. The housing 216 has a front wall 216A, a rear wall, 216B, left and right side walls 216C, 216D, and a top wall 216E. The walls have inboard folds 230A-230E and outboard folds 232A-232E. When the shelter 210 is erected, the inboard folds 230A-230D and outboard folds 232A-232D of the front, rear and side walls 216A-216D are engaged with the floor 214 and the support surface S as described above with respect to shelter 10 (e.g., see FIGS. 11 and 12).

In this embodiment, the door 220 is in the side wall 216D instead of the front wall 216A. The side wall 216D has inboard and outboard folds to the left of the door and an inboard fold to the right of the door. The window flaps 222 are also arranged differently than on the shelter 10. In particular, there are three groups of four window flaps 222 on the front wall 216A and the rear wall 216B, two window flaps on the left side wall 216C, and three window flaps on the right side wall 216D to the left side of the door. Other positions and configurations for the windows and door(s) may be used without departing from the scope of the present invention.

When erected, the front wall 216A and rear wall 216B are non-perpendicular with respect to the support surface S. More specifically, the front and rear walls 216A, 216B, slope outwardly from the top wall toward the support surface S. The walls 216A-216D may be substantially vertical or be non-vertical (i.e., sloped) when erected without departing from the scope of the present invention.

Figure 18:
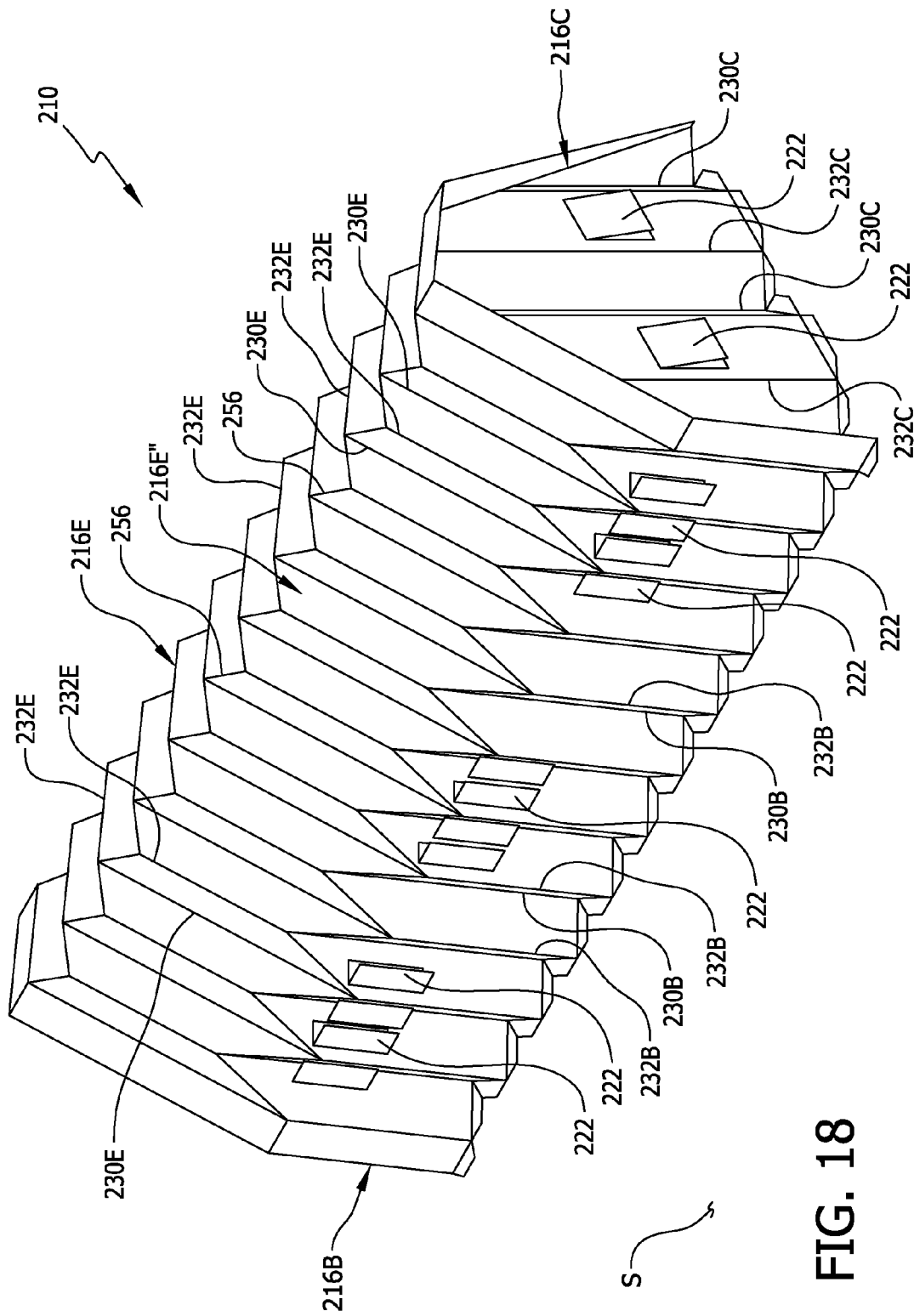
FIG. 18 is a rear perspective of the portable shelter of FIG. 17.
Figure 19:
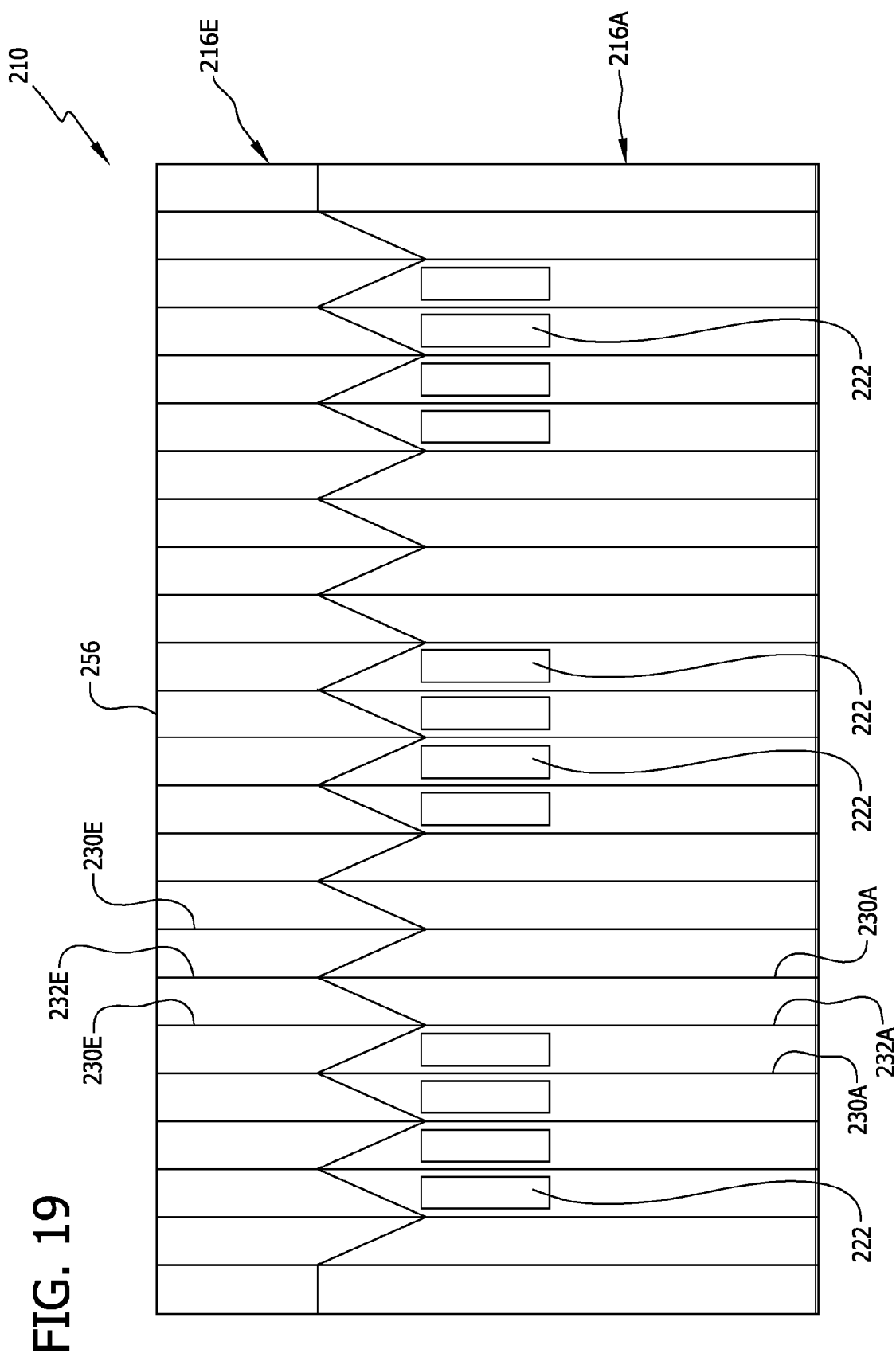
FIG. 19 is a front elevation of the portable shelter.
Figure 20:
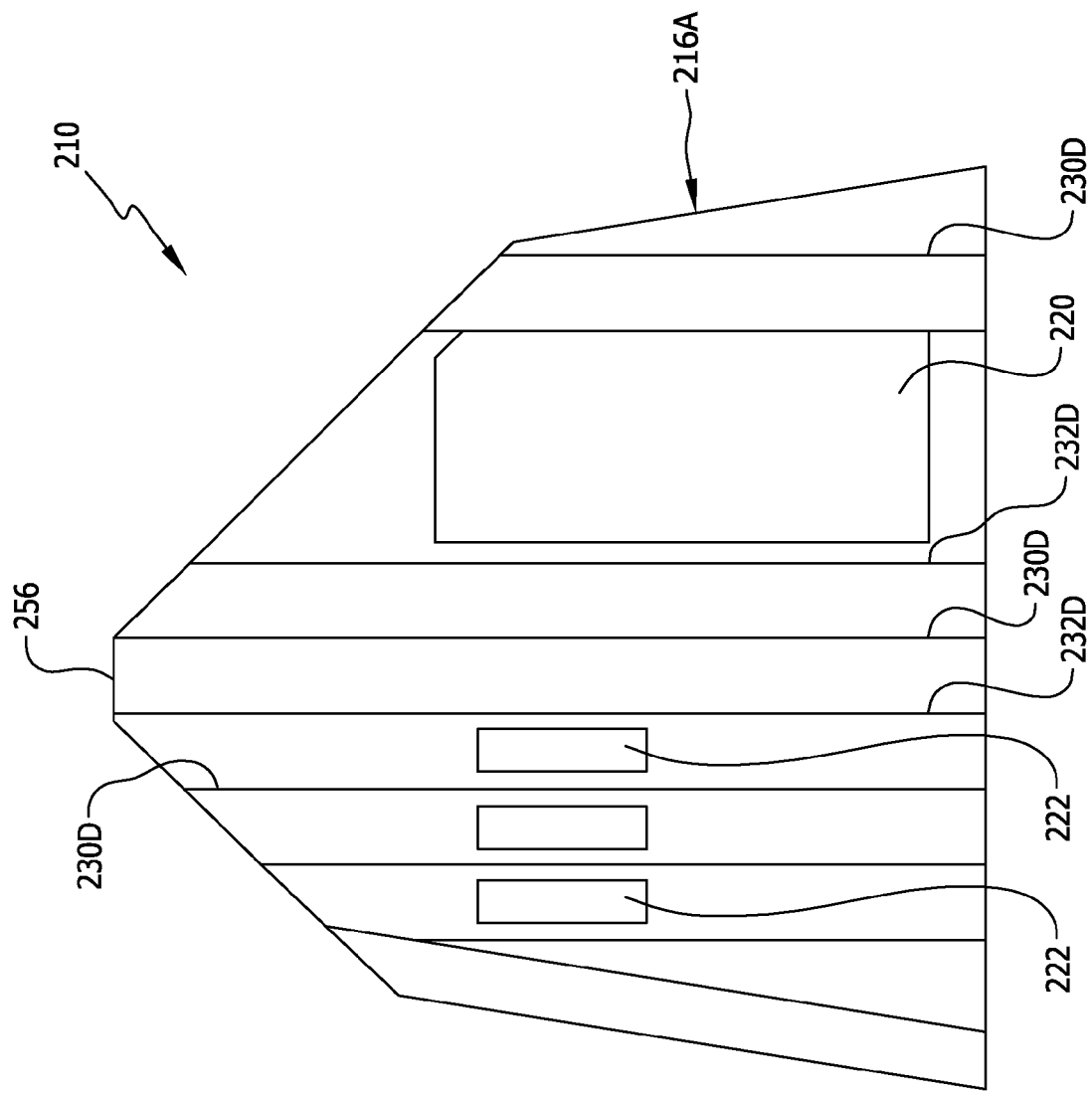
FIG. 20 is a right elevation of the portable shelter.
Figure 21:
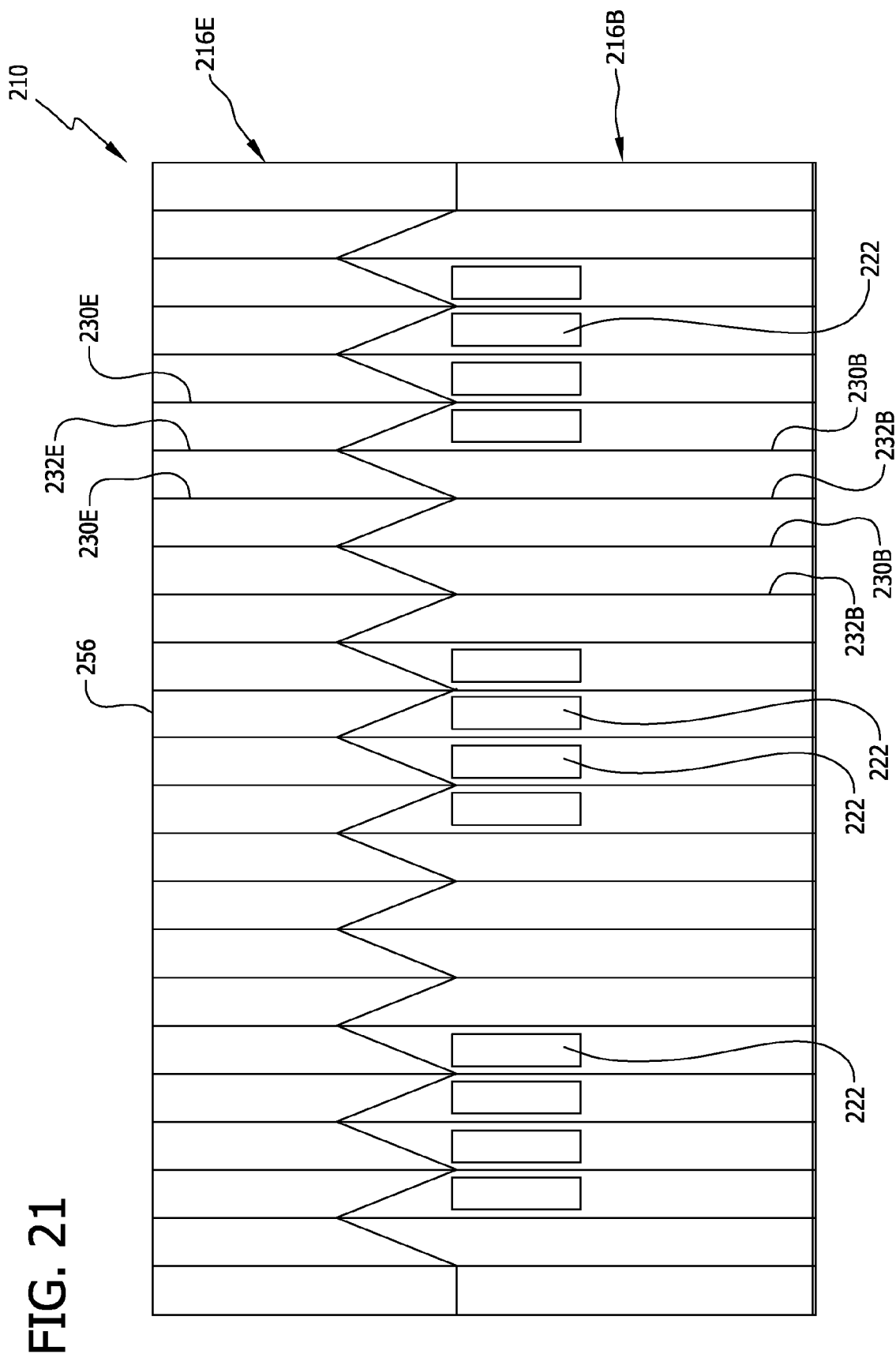
FIG. 21 is a rear elevation of the portable shelter.
Figure 22:
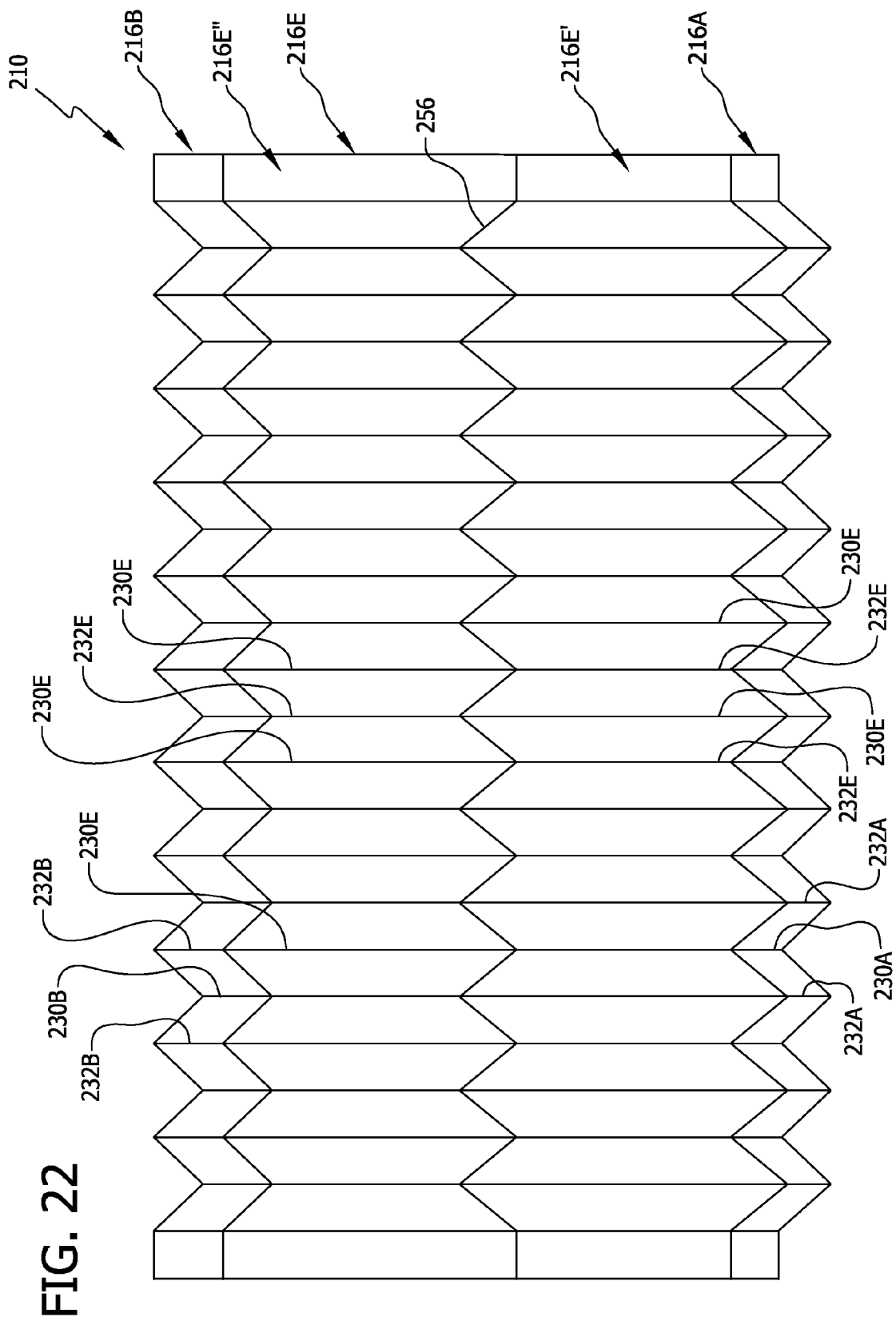
FIG. 22 is a top plan view of the portable shelter.
Figure 23:
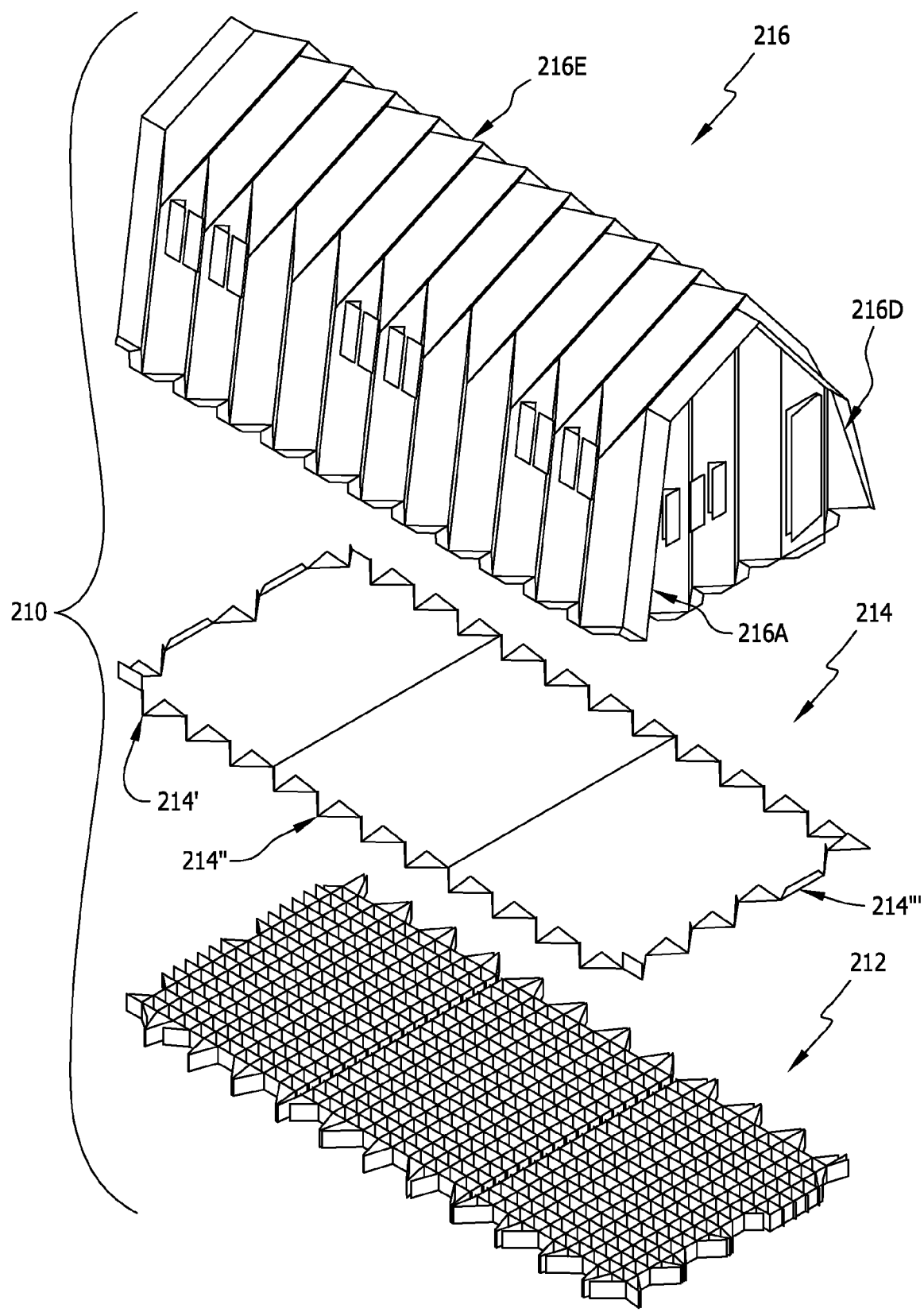
FIG. 23 is an exploded perspective of the portable shelter, the portable shelter including a foundation, a floor, and a housing.
Figure 24:
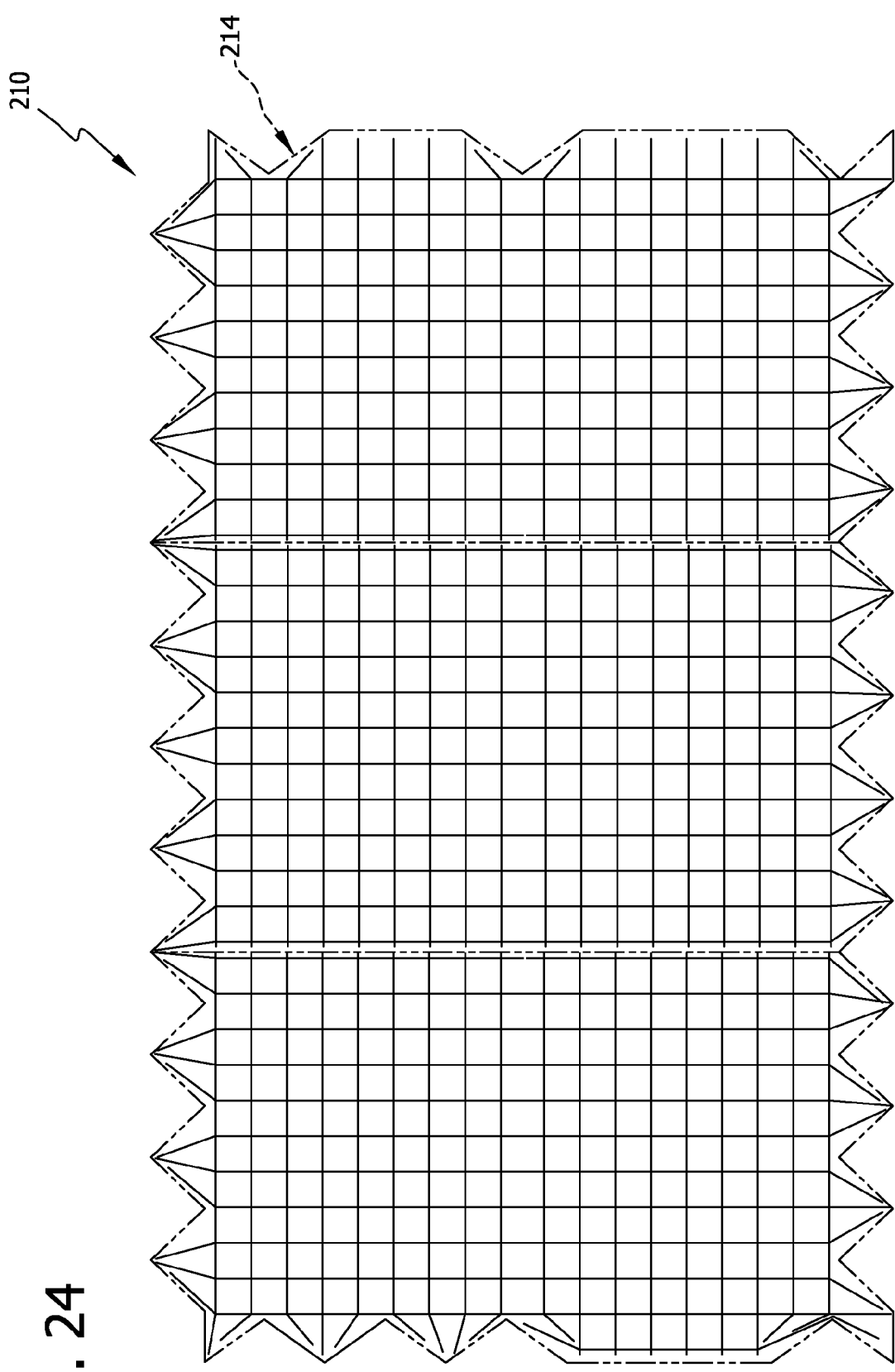
FIG. 24 is a plan view of the foundation, the floor perimeter being shown in phantom.
Figure 25:
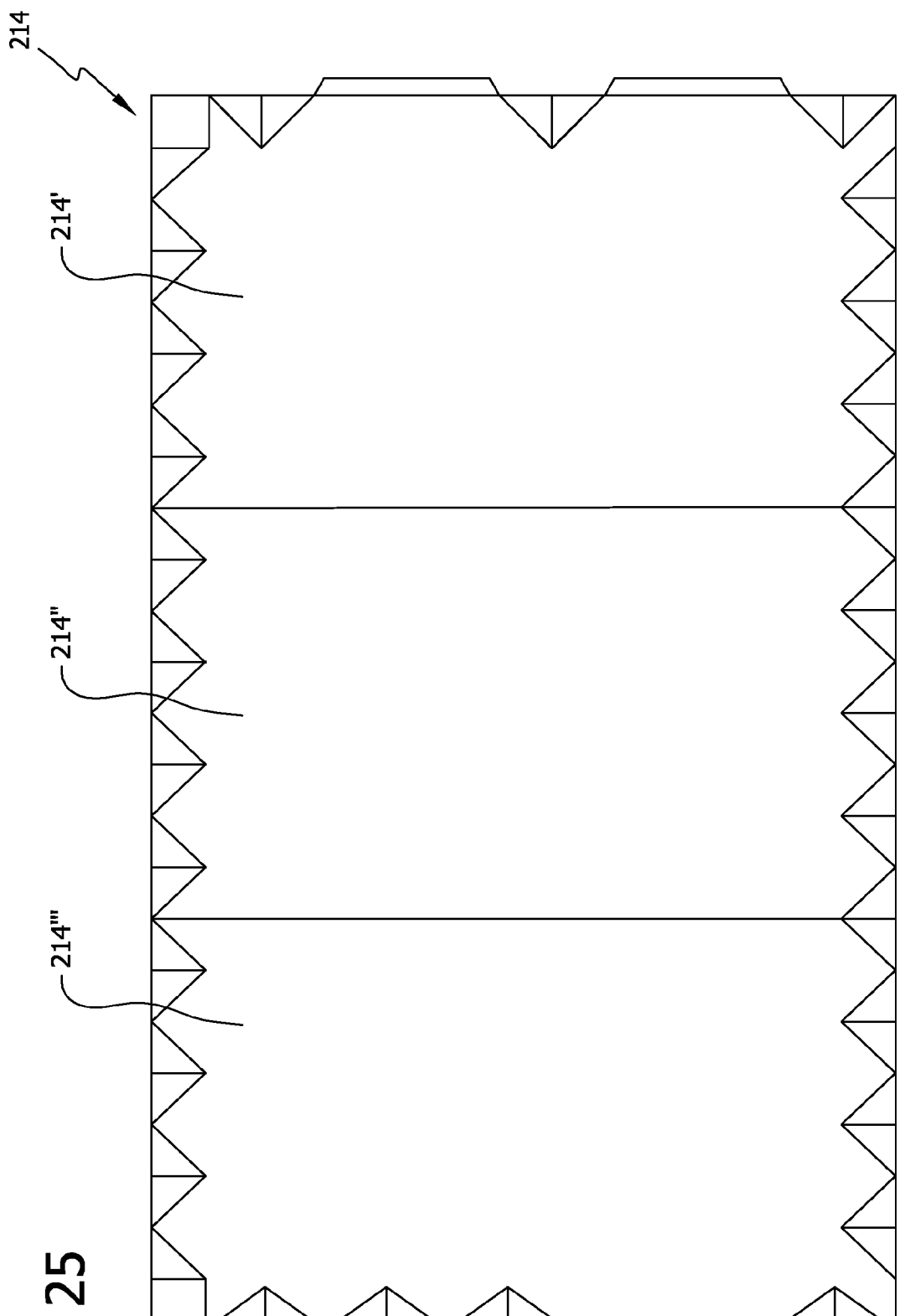
FIG. 25 is a plan view of the floor.
Figure 26:
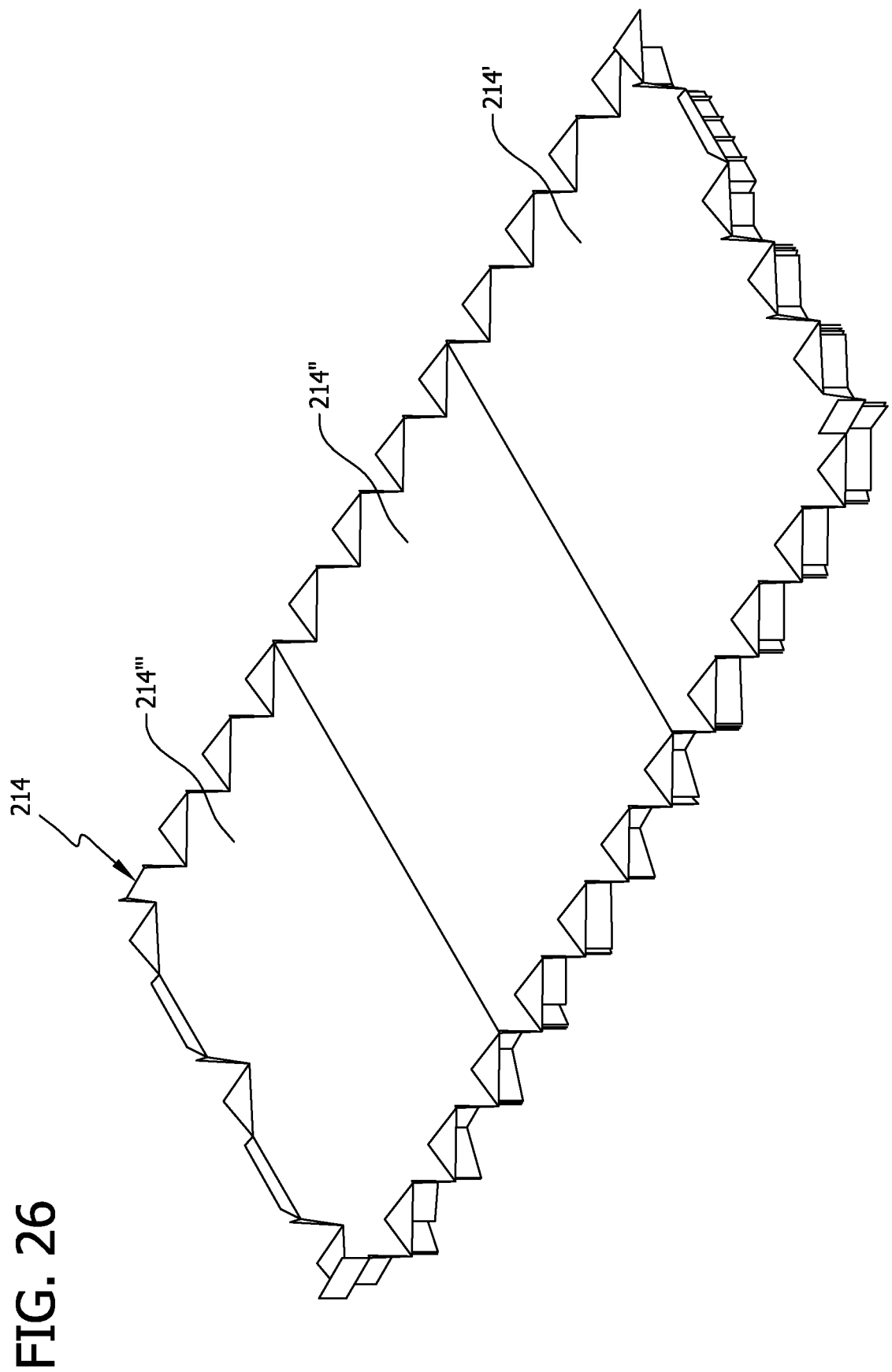
FIG. 26 is a perspective of the floor on the foundation positioned on a support surface, flaps of the floor being folded upward to create indentations in the floor adapted for receiving folds of the housing walls.

In this embodiment, the top wall or roof 216E has a peak or apex 256. The apex 256 extends along the width of the roof 216E between the left and right ends of the roof (between the left and right side walls 216C, 216D). As shown in FIG. 22, the apex 256 is formed by a generally zig-zag shaped line extending along the width of the roof 216E. Referring to FIG. 17, the roof 216E includes a front portion 216E' which is in front of the apex 256 and slopes downwardly from the apex toward the upper end of the front wall 216A. Referring to FIG. 18, the roof 216E also includes a rear portion 216E" which slopes downwardly from the apex toward the upper end of the rear wall 216B. The roof portions may have slopes of between about 30 degrees and about 70 degrees, or more preferably between about 45 degrees and about 55 degrees. Other slopes (e.g., zero degrees) may be used without departing from the scope of the present invention. Moreover, the apex may have a different configuration (e.g., extend along the length of the shelter 210), and the shelter 210 may include gables.

Referring to FIGS. 17, 18, and 22, the roof includes inboard and outboard folds 230E, 232E extending along generally parallel fold lines which extend along the length of the roof. The folds 230E, 232E are spaced from each other between the left and right ends of the roof 216E. The outboard and inboard folds 230E, 232E have lengths extending between the front and rear walls 216A, 216B. At the apex 256, the inboard folds 230E transition to or are connected to outboard folds 232E, and vice versa. In other words, the generally parallel fold lines extending along the length of the roof 216E each include an inboard fold 230E on one side of the apex 256 and an outboard fold 232E on the other side of the apex.

Figure 27:
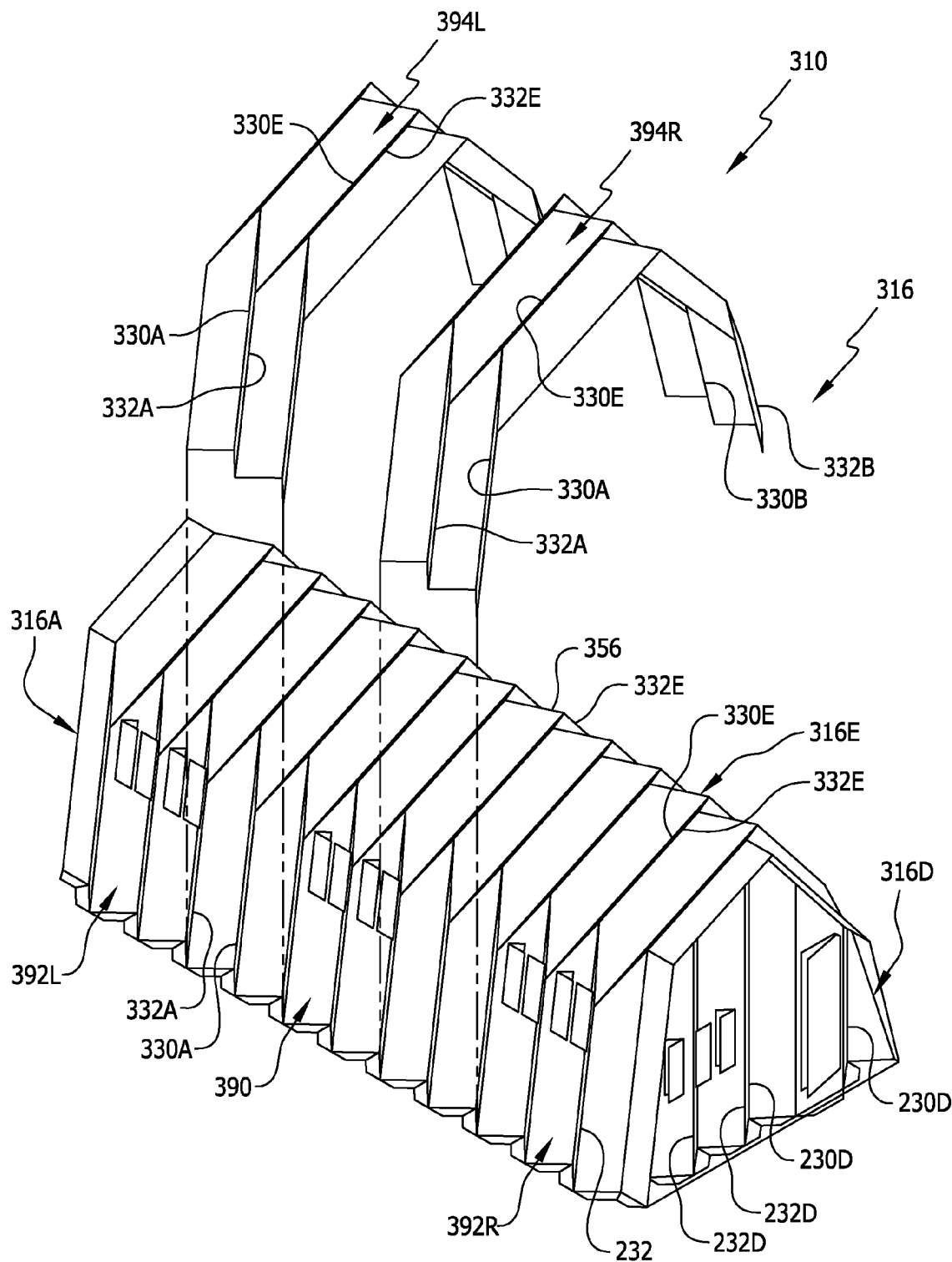
FIG. 27 is a partially exploded view of a fourth embodiment of a portable shelter of the present invention, the portable shelter including a housing formed by multiple housing components.

Referring to FIG. 27, a fourth embodiment of a portable shelter of the present invention is designated generally by the reference number 310. This embodiment of the shelter 310 has a modular construction such as the shelter 110 described above. The portable shelter 310 is essentially identical to the shelter 210 described above except as described hereafter. For example, the shelter 310 includes a housing 316 having walls (only the front wall 316A, right side wall 316D, and roof 316E being shown) including inboard and outboard folds (only the folds 330A, 332A, 330D, 332D, 330E, 332E being shown). In this embodiment, the housing 316 is formed of multiple separately formed housing components. More specifically, the housing includes a central housing component 390, a left side housing component 392L, and a right side housing component 392R. The central, left side, and right side housing components 390, 392L, 392R are essentially identical to each other and include window flaps 322. The housing 316 also includes intermediate left and right side housing components 394L, 394R. FIG. 27 illustrates the housing 316 in an exploded state, the intermediate left and right side housing components 394L, 394R raised above the housing 316. The intermediate left and right side housing components 394L, 394R overlap respective portions of the central and left and right side housing components 390, 392L, 392R, as described above with respect to the intermediate left and right side housing components 394L, 394R of shelter 310. Each housing component 390, 392L, 392R, 394L, 394R forms a portion of the front wall 316A, roof 316E, and rear wall 316B of the housing 316.

Figure 28:
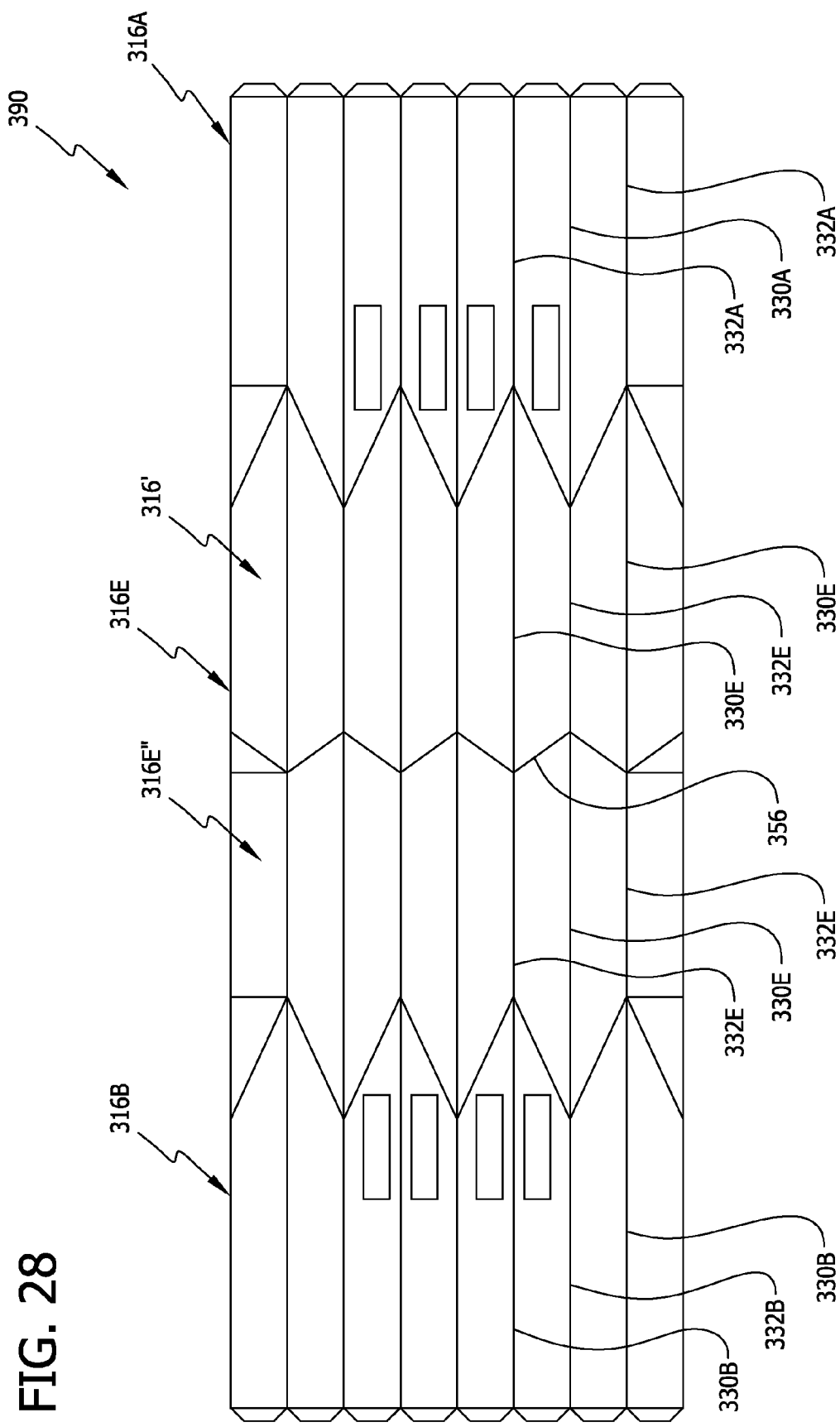
FIG. 28 is a plan view of a first unfolded housing component of the portable shelter of FIG. 27.
Figure 29:
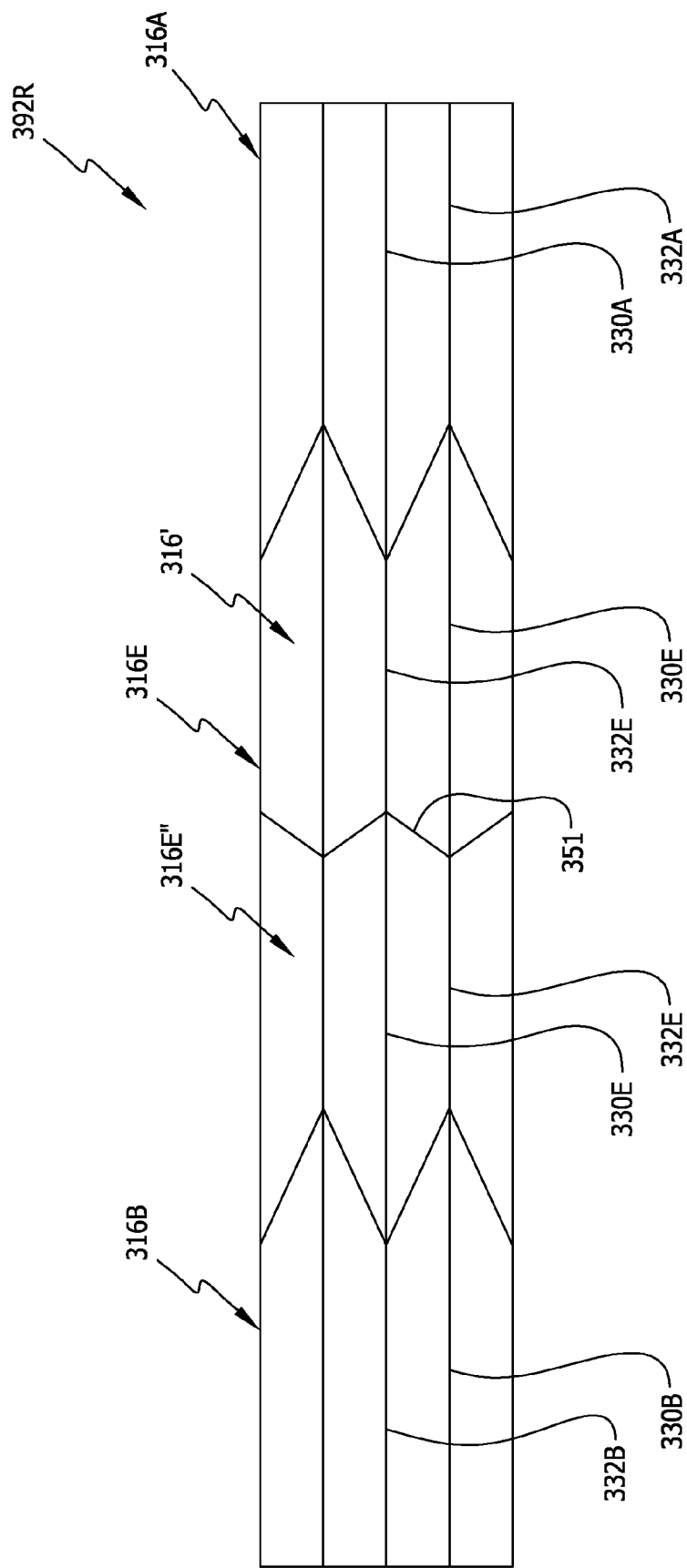
FIG. 29 is a plan view of a second unfolded housing component of the portable shelter of FIG. 27, the housing component being adapted for when erected overlapping the component of FIG. 28.
Figure 30:
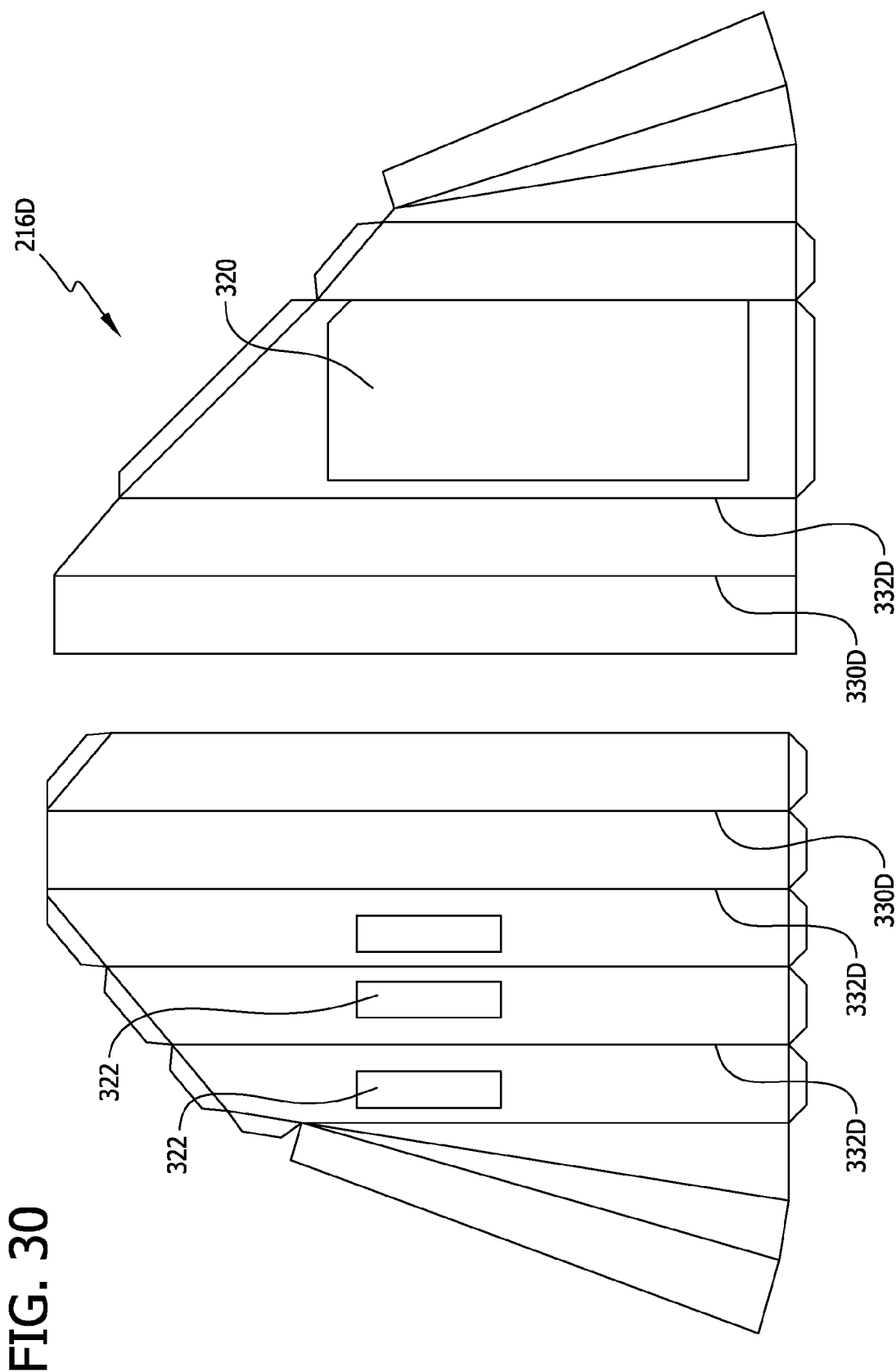
FIG. 30 is a plan view of two unfolded housing components which together form a right wall of the housing.

Each of the housing components 390, 392L, 392R, 394L, 394R may be formed as separate blanks. For example, FIG. 28 illustrates a plan view of a blank of the central housing component 390. The central housing component 390 is shown in an unfolded state. Example fold regions are shown for folding the central housing component 390 for forming inboard and outboard folds 330A, 332A, 330B, 332B, 330E, 332E and for forming portions of the front wall 316A, rear wall 316B, roof 316E, and apex 356. The blank may be scored along the fold regions to facilitate folding of the blank. It will be understood the blanks used for forming the left and right side housing components 392L, 392R may be essentially identical to the blank shown in FIG. 28. FIG. 29 illustrates a plan view of the intermediate right side housing component 394R. Example fold regions are illustrated for forming inboard and outboard folds 330A, 332A, 330B, 332B, 330E, 332E and for forming portions of the front wall, roof, and rear wall 316A, 316E, 316B. It will be understood the intermediate left side housing component 394L may be essentially identical. FIG. 30 illustrates two blanks which may be overlapped and fastened together to form the right side wall 316D. Example fold regions are illustrated for forming inboard and outboard folds 330D, 332D. Cut or score lines are also shown for forming the window flaps 322 and door 320. FIG. 31 illustrates two blanks which may be overlapped and fastened together to form the left side wall 316C. Example fold regions are illustrated for forming inboard and outboard folds 330C, 332C. Blanks having other configurations may be used without departing from the scope of the present invention.

The modular construction of the shelter 310 provides advantages such as described above with respect to the modular shelter 110. For example, the separately formed housing components 390, 392L, 392R, 394L, 394R facilitate packing and transportation of the portable shelter 310. The housing components may be assembled in ways such as described above with respect to the shelter 110.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A portable shelter which is erectable on a support surface for defining an interior for temporarily sheltering a human, the portable shelter comprising:

a front wall having when erected an upper end, a lower end, and a height extending between the upper and lower ends of the front wall, and a left end, a right end, and a width extending between the left and right ends of the front wall, the front wall including folds extending along generally parallel fold lines which extend along the height of the front wall and are spaced from each other between the left and right ends of the front wall, the folds including outboard folds and inboard folds, the outboard folds of the front wall being disposed outward of the inboard folds of the front wall in the erected shelter;

a rear wall having when erected an upper end, a lower end, and a height extending between the upper and lower ends of the rear wall, and a left end, a right end, and a width extending between the left and right ends of the rear wall, the rear wall including folds extending along generally parallel fold lines which extend along the height of the rear wall and are spaced from each other between the left and right ends of the rear wall, the folds including outboard folds and inboard folds, the outboard folds of the rear wall being disposed outward of the inboard folds of the rear wall in the erected shelter; and a top wall having when erected a front end, a rear end, and a length extending between the front and rear ends of the top wall, and a left end, a right end, and a width extending between the left and right ends of the top wall, the front end of the top wall being connected to the upper end of the front wall and the rear end of the top wall being connected to the upper end of the rear wall so the length of the top wall extends between the front and rear walls, the top wall including folds extending along generally parallel fold lines which extend along the length of the top wall and are spaced from each other between the left and right ends of the top wall, the folds including outboard folds and inboard folds, the outboard folds of the top wall being disposed outward of the inboard folds of the top wall in the erected shelter;

wherein the front wall includes a generally planar portion having an opening sized for a person to enter the interior of the shelter through the opening and at least one of each of the inboard and outboard folds of the front wall is positioned to the left of the opening and at least one of each of the inboard and outboard folds of the front wall is positioned to the right of the opening when the portable shelter is erected; and wherein the generally planar portion is oriented in a front plane in the erected shelter and fold panels extend between consecutive ones of said at least one of each of the inboard and outboard folds of the front wall, said fold panels being oriented in respective planes disposed at angles to the front plane.

2. A portable shelter as set forth in claim 1 wherein upper ends of the inboard folds of the front wall are in register with front ends of respective outboard folds of the top wall and upper ends of the outboard folds of the front wall are in register with front ends of respective inboard folds of the top wall when the portable shelter is erected.

3. A portable shelter as set forth in claim 2 wherein upper ends of the inboard folds of the rear wall are in register with rear ends of respective outboard folds of the top wall and upper ends of the outboard folds of the rear wall are in register with rear ends of respective inboard folds of the top wall when the portable shelter is erected.

4. A portable shelter as set forth in claim 3 wherein the outboard and inboard folds of the top wall have lengths extending between the front and rear walls and the outboard folds are at least half as long as the inboard folds when the portable shelter is erected.

5. A portable shelter as set forth in claim 3 wherein at least a portion of the front, rear, and top walls are formed of a single piece of a sheet material, the sheet material having a length and a width, the sheet material being folded along its length to form the inboard and outboard folds of the front, rear, and top walls, the sheet material being folded along its width along a first fold region where the upper end of the front wall is to be connected to the front end of the top wall, and the sheet material being folded along its width along a second fold region where the upper end of the rear wall is to be connected to the rear end of the top wall.

6. A portable shelter as set forth in claim 5 wherein the sheet material is folded along its width along a third fold region, the fold along the third fold region defining an apex of the top wall, the top wall having a front portion in front of the apex and a rear portion behind the apex, the front portion sloping downwardly from the apex toward the upper end of the front wall, and the rear portion sloping downwardly from the apex toward the upper end of the rear wall.

7. A portable shelter as set forth in claim 3 wherein the front, rear, and top walls are formed by a plurality of housing components, each of the housing components including inboard and outboard folds, at least a first of the housing components being adapted for overlapping a second of the housing components to form the portable shelter, the inboard and outboard folds of the first and second housing components being configured so when the first and second housing components are overlapped, at least one inboard fold of the first housing component engages a corresponding inboard fold of the second housing component and at least one outboard fold of the first housing component engages a corresponding outboard fold of the second housing component.

8. A portable shelter as set forth in claim 1 further comprising a side wall having when erected an upper end, a lower end, and a height extending between the upper and lower ends, and a front end, a rear end, and a length extending between the front and rear ends, the front end of the side wall being connected to the front wall, the rear end of the side wall being connected to the rear wall, and the top end of the side wall being connected to the top wall, the side wall including folds extending along generally parallel fold lines which extend along the height of the side wall and are spaced from each other between the front and rear ends of the side wall, the folds including outboard folds and inboard folds, the outboard folds being disposed outward of the inboard folds in the erected shelter.

9. A portable shelter as set forth in claim 1 wherein at least one of the front and rear walls is folded along a line extending along the width of said at least one front and rear walls to form a portion of the lower end of said at least one front and rear wall into a generally planar foot having a flat bottom surface positioned for the flat bottom surface of the foot to engage said support surface in generally flatwise engagement.

10. A portable shelter as set forth in claim 1 further comprising a floor, the floor having a front end, a rear end, and a length extending between the front and rear ends, and a left end, a right end, and a width extending between the left and right ends, the floor being positionable below the top wall and between the front and rear walls, the front end of the floor including indentations which are configured for receiving lower portions of the inboard folds of the front wall.

11. A portable shelter which is erectable on a support surface for defining an interior for temporarily sheltering a human, the portable shelter comprising:

a front wall having when erected an upper end, a lower end, and a height extending between the upper and lower ends, and a left end, a right end, and a width extending between the left and right ends, the front wall including folds extending along generally parallel fold lines which extend along the height of the front wall and are spaced from each other between the left and right ends of the front wall, the folds including outboard folds and inboard folds, the outboard folds being disposed outward of the inboard folds in the erected shelter; and a floor adapted for being supported above the support surface adjacent the lower end of the front wall, the floor having a front end, a rear end, and a length extending between the front and rear ends, and a left end, a right end, and a width extending between the left and right ends, the front end of the floor including indentations which are configured for receiving lower portions of the inboard folds of the front wall;

wherein the front wall has when erected an inner and an outer surface, the inner surface facing inward in the erected shelter, and the floor has a top surface facing upward in the erected shelter and a front edge facing outward in the erected shelter, and wherein the front edge of the floor when erected with the front wall engages the inner surface of the front wall in the erected shelter along the width of the front wall to provide lateral support to the front wall, the shape of the front edge corresponds to the shape of the inner surface.

12. A portable shelter as set forth in claim 11 wherein the indentations in the front end of the floor define concavity which closely conforms to an inner profile of a respective inboard fold so the lower portions of the inboard folds of the front wall mate with the indentations in the front end of the floor when the portable shelter is erected.

13. A portable shelter as set forth in claim 12 wherein the front end of the floor includes a protrusion positioned between first and second of said indentations, the protrusion having a profile which closely conforms to an inner profile of a respective outboard fold of the front wall so a lower portion of the outboard fold mates with the protrusion when the portable shelter is erected.

14. A portable shelter as set forth in claim 12 wherein the front end of the floor includes at least one fold region where the floor is foldable to form at least a portion of one of the indentations adjacent the fold region and form an upstanding portion of the floor adjacent the indentation, the upstanding portion of the floor having an outer surface adapted for engaging and being fastened to an inner surface of the front wall in generally flatwise engagement when the inboard fold is mated in the indentation for securing the inboard fold in the indentation.

15. A portable shelter as set forth in claim 14 wherein the front end of the floor includes two fold regions where the floor is foldable to form at least a portion of said indentation adjacent the fold regions and form two upstanding portions of the floor adjacent the indentation each having an outer surface adapted for engaging and being fastened to respective inner surfaces of the front wall on opposite left and right sides of the inboard fold when the inboard fold is mated with the indentation for securing the inboard fold in the indentation.

16. A portable shelter as set forth in claim 11 further including a rear wall having when erected an upper end, a lower end, and a height extending between the upper and lower ends, and a left end, a right end, and a width extending between the left and right ends, the rear wall including folds extending along generally parallel fold lines which extend along the height of the rear wall and are spaced from each other between the left and right ends of the rear wall, the folds including outboard folds and inboard folds, the outboard folds being disposed outward of the inboard folds in the erected shelter, wherein the rear end of the floor includes indentations which are configured for receiving lower portions of the inboard folds of the rear wall.

17. A portable shelter as set forth in claim 16 further including a side wall having when erected an upper end, a lower end, and a height extending between the upper and lower ends, and a front end, a rear end, and a length extending between the front and rear ends, the front end of the side wall being adapted for connection to the front wall, the rear end of the side wall being adapted for connection to the rear wall, the side wall including folds extending along generally parallel fold lines which extend along the height of the side wall and are spaced from each other between the front and rear ends of the side wall, the folds including outboard folds and inboard folds, the outboard folds being disposed outward of the inboard folds in the erected shelter, wherein one of the left and right ends of the floor corresponds to the side wall and includes indentations which are configured for receiving lower portions of the inboard folds of the side wall.

18. A portable shelter as set forth in claim 11 wherein the front wall is folded along a line extending along the width of the front wall to form a portion of the lower end of the front wall into a generally planar foot having a generally flat bottom surface positioned for engaging said support surface in generally flatwise engagement.

19. A portable shelter which is erectable on a support surface for defining an interior for temporarily sheltering a human, the portable shelter comprising:
 a top wall forming when erected a roof above the interior; and
 a wall adapted for connection to the top wall, the wall having when erected an upper end, a lower end, and a height extending between the upper and lower ends, and a left end, a right end, and a width extending between the left and right ends, the wall including folds extending along generally parallel fold lines which extend along the height of the wall and are spaced from each other between the left and right ends of the wall, the folds including outboard folds and inboard folds, the outboard folds being disposed outward of the inboard folds in the erected shelter, the wall comprising at least first, second, and third wall components including inboard and outboard folds in the erected shelter, the wall components each having when erected an upper end, a lower end, and a height extending between the upper and lower ends, and a left end, a right end, and a width extending between the left and fight ends, the fight end of the first wall component being positioned adjacent the left end of the second wall component, the third wall component overlying and bridging the adjacent fight and left ends of the first and second wall components; the third wall component having at least one inboard or outboard fold nested with a corresponding inboard or outboard fold of the first wall component and having at least one inboard or outboard fold nested with a corresponding inboard or outboard fold of the second wall component thereby providing additional structural integrity to the portable structure when erected;
 wherein each of the inboard and outboard folds define an intersection between a respective pair of panels oriented at an angle to one another, each panel of said pair of panels having major surfaces including an inner major surface and an outer major surface, one of the major surfaces of each of said pair of panels of said at least one inboard or outboard fold of the third wall component engaging one of the major surfaces of a respective one of the panels of said pair of panels of said at least one inboard or outboard folds of the first wall component when said at least one inboard or outboard fold of the third wall component is nested with said at least one inboard or outboard fold of the first wall component.

* * * * *